US012786871B2

(12) United States Patent
Geng et al.

(10) Patent No.: US 12,786,871 B2
(45) Date of Patent: Nov. 3, 2026

(54) COMMUNICATION METHOD AND APPARATUS

(71) Applicant: HUAWEI TECHNOLOGIES CO., LTD., Shenzhen (CN)

(72) Inventors: Tingting Geng, Shanghai (CN); Xingxing Hu, Shanghai (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 412 days.

(21) Appl. No.: 18/181,337

(22) Filed: Mar. 9, 2023

(65) Prior Publication Data

US 2023/0209467 A1 Jun. 29, 2023

Related U.S. Application Data

(63) Continuation of application No. PCT/CN2020/114882, filed on Sep. 11, 2020.

(51) Int. Cl.
*H04W 52/02* (2009.01)
*H04W 24/02* (2009.01)

(52) U.S. Cl.
CPC ....... *H04W 52/0219* (2013.01); *H04W 24/02* (2013.01); *H04W 52/0235* (2013.01)

(58) Field of Classification Search
CPC ......... H04W 52/0219; H04W 52/0235; H04W 52/0206; H04W 24/02
See application file for complete search history.

(56) References Cited

U.S. PATENT DOCUMENTS

| | | | | |
|---|---|---|---|---|
| 12,010,619 B2 * | 6/2024 | Zhou | H04W 52/0209 |
| 2012/0329471 A1 | 12/2012 | Barta et al. | |
| 2013/0058269 A1 * | 3/2013 | Xia | H04W 52/0206 370/311 |
| 2013/0094439 A1 * | 4/2013 | Moshfeghi | H04B 7/043 370/328 |

(Continued)

FOREIGN PATENT DOCUMENTS

| | | | |
|---|---|---|---|
| CN | 110769484 A | 2/2020 |
| CN | 110971373 A | 4/2020 |
| CN | 111436093 A | 7/2020 |

OTHER PUBLICATIONS

ZTE, "Artificial Intelligence based Energy Saving," 3GPP TSG RAN WG e-Meeting #88-e, Jun. 29, 2020-Jul. 3, 2020, RP-200781; 5 total pages.

(Continued)

*Primary Examiner* — Redentor Pasia
(74) *Attorney, Agent, or Firm* — Rimon PC

(57) ABSTRACT

A communication method and an apparatus are provided. The communication method includes: an AI device determines an energy saving policy based on collected AI data. The AI device notifies a network device of the energy saving policy. The network device performs an energy saving operation according to the energy saving policy. Compared with a solution in which a network device or an OAM system determines and implements an energy saving policy by using human experience or a simple algorithm, the energy saving mechanisms disclosed herein are more intelligent, and can meet higher energy saving requirements of the network.

18 Claims, 6 Drawing Sheets

(56) References Cited

U.S. PATENT DOCUMENTS

| | | | | |
|---|---|---|---|---|
| 2015/0282087 | A1* | 10/2015 | Yang | H04W 52/0235 370/311 |
| 2016/0337964 | A1 | 11/2016 | Mochizuki | |
| 2019/0387471 | A1* | 12/2019 | Salmela | H04W 52/0229 |
| 2021/0274361 | A1* | 9/2021 | Gupta | H04W 28/02 |
| 2021/0289439 | A1* | 9/2021 | Berg | H04W 52/0206 |
| 2022/0046498 | A1* | 2/2022 | Cheng | H04B 7/1851 |
| 2023/0156760 | A1* | 5/2023 | Cui | H04W 24/10 370/329 |
| 2023/0239784 | A1* | 7/2023 | Zhang | H04W 52/0206 370/318 |
| 2024/0422055 | A1* | 12/2024 | Estevez | H04L 41/0816 |

OTHER PUBLICATIONS

3GPP TS 23.502 V16.4.0 (Mar. 2020), 3rd Generation Partnership Project; Technical Specification Group Services and System Aspects; Procedures for the 5G System (5GS); Stage 2 (Release 16); 582 total pages.

3GPP TS 38.413 V16.1.0:"3rd Generation Partnership Project; Technical Specification Group Radio Access Network; NG-RAN;NG Application Protocol (NGAP)(Release 16)",Mar. 2020,total 341 pages.

3GPP TS 37.320 V16.0.0 (Mar. 2020), 3rd Generation Partnership Project, Technical Specification Group Radio Access Network; Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16); 34 total pages.

3GPP TS 38.473 V15.4.1 (Jan. 2019), 3rd Generation Partnership Project; Technical Specification Group Radio Access Network; NG-RAN;F1 application protocol (F1 AP) (Release 15); 192 total pages.

3GPP TS 38.331 V16.1.0 (Jul. 2020), 3rd Generation Partnership Project; Technical Specification Group Radio Access Network; NR; Radio Resource Control (RRC) protocol specification(Release 16); 911 total pages.

3GPP TS38.300 V16.1.0, (Mar. 2020) 3rd Generation Partnership Project; Technical Specification Group Radio Access Network;NR; NR and NG-RAN Overall Description;Stage 2 (Release 16); 133 total pages.

3GPP TS 38.423 V16.1.0 (Mar. 2020), 3rd Generation Partnership Project; Technical Specification Group Radio Access Network; NG-RAN; Xn application protocol (XnAP) (Release 16); 334 total pages.

3GPP TS 36.331 V15.7.0 (Sep. 2019), 3rd Generation Partnership Project; Technical Specification Group Radio Access Network; Evolved Universal Terrestrial Radio Access (E-UTRA); Radio Resource Control (RRC); Protocol specification (Release 15); 962 total pages.

3GPP TS 36.321 V15.5.0 (Mar. 2019), 3rd Generation Partnership Project; Technical Specification Group Radio Access Network; Evolved Universal Terrestrial Radio Access (E-UTRA); Medium Access Control (MAC) protocol specification (Release 15); 131 total pages.

* cited by examiner

COMMUNICATION METHOD AND APPARATUS

CROSS-REFERENCE TO RELATED APPLICATIONS

This application is a continuation of International Application No. PCT/CN2020/114882, filed on Sep. 11, 2020, the disclosure of which is hereby incorporated by reference in its entirety.

TECHNICAL FIELD

Embodiments of this application relate to the field of communication technologies, and in particular, to a communication method and an apparatus.

BACKGROUND

Currently, a mobile network needs to support different performance requirements such as ultra-high rate, ultra-low latency, ultra-high reliability, and/or ultra-multi-connection because of increasingly diversified services supported by the network. This makes network planning, network configuration, and resource scheduling more and more complex. A mobile network uses an increasingly broad communication spectrum, and continuously introduces new technologies such as high-order multiple-input multiple-output (MIMO), beamforming, and beam management, all of which significantly increase the energy consumption of the network. Therefore, more stringent energy saving requirements are imposed on the mobile network.

SUMMARY

Embodiments of this application provide a communication method and an apparatus, to perform an energy saving operation by using an artificial intelligence (AI) node, thereby satisfying higher requirements of energy saving of a network and meeting new challenges of a wireless communication system.

According to a first aspect, a communication method is provided. The method may be performed by a network device, or may be a component (a processor, a chip, a circuit, or the like) configured in the network device. The method includes: sending AI data to an AI device; and receiving first indication information from the AI device. The first indication information is determined based on the AI data.

By implementing the foregoing method, the AI device may determine configuration information of the network device based on collected AI data, and indicate the configuration information to the network device by using the first indication information, so that a high requirement of energy saving of the network device can be satisfied, and a new challenge of a wireless communication system can be met. In the following first design and/or second design, the AI device may determine an energy saving policy based on the collected AI data, and the AI device notifies the network device of the energy saving policy. The network device performs an energy saving operation according to the energy saving policy. Compared with a solution in which a network device or an operation, administration, and maintenance (OAM) system determines an energy saving policy by using human experience or a simple algorithm and implements the energy saving policy, an intelligent energy saving mechanism of a network can be implemented, and a high requirement of energy saving of the network can be satisfied.

In a first design, the first indication information includes an energy saving policy, and the energy saving policy indicates at least one of the following: an energy saving area (ESA) to which the cell served by the network device belongs; and an energy saving priority of each cell in the ESA.

By implementing the foregoing method, an ESA area corresponding to each cell may be allocated to the cell, and in a subsequent cell handover process, a neighboring cell with a same ESA may be preferentially handed over to, to avoid affecting execution of an energy saving policy in other areas with different ESAs.

Optionally, the AI data includes at least one of the following: coverage information of the cell, and common configuration information of the cell.

Optionally, the coverage information of the cell includes at least one of the following: position information of a terminal device in the cell, beam information measured by the terminal device, cell quality information measured by the terminal device, time information, and cell identity information.

Optionally, the common configuration information of the cell includes first common configuration information, and the first common configuration information includes at least one of the following: a period of a synchronization signal/physical broadcast channel block (SSB); a period of a master information block (MIB); a period of a system message block 1 (SIB1) or a period of a system message that needs to be broadcast and sent; paging configuration information; configuration information of a random access resource; a quantity of SSB beams of the cell; a quantity of antennas; and a maximum transmit power of the cell.

Optionally, the common configuration information of the cell includes second common configuration information, and the second common configuration information includes at least one of the following: a subcarrier spacing supported by the cell; a slice type supported by the cell; and a service type supported by the cell.

Optionally, the method further includes: sending a first request to the terminal device, where the first request is for requesting the terminal device to collect the coverage information of the cell; and receiving a first response from the terminal device, where the first response includes the coverage information of the cell collected by the terminal device. Optionally, the first request may further include a type of data collected by the terminal device, a reporting manner of each piece of collected data, and/or the like.

By implementing the foregoing method, the AI device may determine energy consumption information of the cell and/or the coverage information of the cell based on the common configuration information of the cell, and determine an appropriate energy saving policy, so that energy saving of the network device can be maximized, and operation overheads of the network can be reduced.

In a second design, the first indication information includes an energy saving policy, and the energy saving policy includes at least one of the following: slot shutdown, power amplifier shutdown, carrier shutdown, cell shutdown, cell coverage adjustment, and load migration.

By implementing the foregoing method, the energy saving policy may directly shut down a slot, a carrier, a power amplifier, or the like, thereby implementing energy saving of the network device.

Optionally, the AI data includes service information of a cell served by a network device, and the service information of the cell served by the network device includes at least one of the following: configuration information of a channel state information-reference signal CSI-RS in the cell; a maximum quantity of terminal devices in a connected state supported in the cell; a current quantity of terminal devices in a connected state in the cell; a position of a terminal device in the cell; quantity distribution of terminal devices in the cell; spectral efficiency of the cell; a throughput of the cell; a load level of the cell; usage of an uplink physical resource block or a downlink physical resource block in the cell; information about a slice supported by the cell; and usage of a beam resource in the cell.

Optionally, the AI data includes information about a terminal device in the cell, and the information about the terminal device in the cell includes at least one of the following: user experience information of the terminal device; slice or service information of the terminal device; and capability information of the terminal device.

Optionally, the method further includes: sending a second request to a terminal device, where the second request is for requesting the terminal device to collect information about the terminal device; and receiving a second response from the terminal device, where the second response includes the information about the terminal device collected by the terminal device. Optionally, the second request may include a type of data collected by the terminal device, a reporting manner of each piece of data, and/or the like.

By implementing the foregoing method, the AI device better selects an appropriate energy saving policy based on the service information of a cell, so that energy saving of the network device can be maximized, and operation overheads of the network can be reduced.

In a third design, the first indication information includes an update message of common configuration information of a cell served by a network device.

Optionally, a packet of the AI data includes at least one of the following: synchronization signal/physical broadcast channel block (SSB) configuration information of the cell; random access channel (RACH) configuration information of the cell or a carrier in the cell; RACH measurement information of the cell or a carrier in the cell; a quantity of radio resource control RRC connections of the cell; and energy consumption statistical information of the network device.

Optionally, the update message includes at least one of the following: configuration update information of an SSB of the cell; and configuration update information of a RACH of the cell or a carrier in the cell.

Optionally, the method further includes: receiving a third request from the AI device, where the third request is for requesting the network device to report the AI data. Optionally, the third request may include a type of data collected by the network device, a reporting manner of each piece of data, and/or the like.

Optionally, the method further includes: updating, based on the update message, a common configuration of the cell served by the network device; and sending a third response to the AI device, where the third response is for notifying the cell of an updated common configuration.

By implementing the foregoing method, the AI device updates the common configuration information of the cell based on the collected AI data. In this way, the common information configured for the network device better conforms to a current state of the network, thereby implementing energy saving of the network device.

According to a second aspect, a communication method is provided. The method may be performed by an AI device, or may be a component (a processor, a chip, a circuit, or the like) configured in the AI device. The method includes: receiving AI data from a network device; determining, by the AI device, first indication information based on the AI data; and sending, by the AI device, the first indication information to the network device.

By implementing the foregoing method, the AI device may determine configuration information of the network device based on collected AI data, and indicate the configuration information to the network device by using the first indication information, so that information configured for the network device better conforms to an actual status of the network device and energy saving of the network device is implemented.

In a first design, the first indication information includes an energy saving policy, and the energy saving policy indicates at least one of the following: an energy saving area (ESA) to which the cell served by the network device belongs; and an energy saving priority of each cell in the ESA. For specific details of the energy saving policy and the AI data, refer to the description in the first design of the first aspect.

In a second design, the first indication information includes an energy saving policy, and the energy saving policy includes at least one of the following: slot shutdown, power amplifier shutdown, carrier shutdown, cell shutdown, cell coverage adjustment, and load migration. For specific details of the energy saving policy and the AI data, refer to the description in the second design of the first aspect.

In a third design, the first indication information includes an update message of common configuration information of a cell served by a network device. For specific details of the update message and the AI data, refer to the description in the third design of the first aspect.

According to a third aspect, a communication method is provided. The communication method is mainly applied to a solution in which an AI device is integrated with an access network device, and focuses on interaction between a network device and a terminal device. The method includes: receiving target information from the terminal device; and determining, by the network device, first indication information based on the target information of the terminal device.

By implementing the foregoing method, the AI device may be integrated into the network device, thereby simplifying a network architecture. The AI device and the network device directly exchange information internally, thereby improving a data transmission rate and reducing network overheads.

In a first design, the target information includes coverage information of a cell served by the network device, the first indication information includes an energy saving policy, and the energy saving policy indicates at least one of the following: an energy saving area (ESA) to which the cell served by the network device belongs; and an energy saving priority of each cell in the ESA. For details of the coverage information and the energy saving policy, refer to the first design in the first aspect.

In a second design, the target information includes information about a terminal device served by the network device, the first indication information includes an energy saving policy, and the energy saving policy includes at least one of the following: slot shutdown, power amplifier shutdown, carrier shutdown, cell shutdown, cell coverage adjustment, and load migration. For details of the information about the terminal device and the energy saving policy, refer to the second design in the first aspect.

According to a fourth aspect, a communication method is provided. The method is performed by a terminal device, or may be a component (a processor, a chip, a circuit, or the like) configured in the terminal device. The method includes: sending target information to a network device. The target information is used by an AI device or the network device to determine first indication information.

By implementing the foregoing method, the terminal device may report the target information to the network device, and the network device or the AI device may determine the first indication information, for example, an energy saving policy, based on the target information. In this way, information configured by the AI device for the network device can better match an actual network status, thereby implementing energy saving of the network device.

In a first design, the target information includes coverage information of a cell served by the network device, the first indication information includes an energy saving policy, and the energy saving policy indicates at least one of the following: an energy saving area (ESA) to which the cell served by the network device belongs; and an energy saving priority of each cell in the ESA. For details of the coverage information and the energy saving policy, refer to the first design in the first aspect.

In a second design, the target information includes information about a terminal device served by the network device, the first indication information includes an energy saving policy, and the energy saving policy includes at least one of the following: slot shutdown, power amplifier shutdown, carrier shutdown, cell shutdown, cell coverage adjustment, and load migration. For details of the information about the terminal device and the energy saving policy, refer to the second design in the first aspect.

According to a fifth aspect, an apparatus is provided. For beneficial effects, refer to the description of the first aspect. The apparatus may be a network device, or may be an apparatus in a network device, or may be an apparatus that can be used together with a network device. In a design, the apparatus includes units that are in a one-to-one correspondence with the methods/operations/steps/actions described in the first aspect. The units may be implemented by a hardware circuit, or may be implemented by software, or may be implemented by a hardware circuit in combination with software. For example, the apparatus may include a processing unit and a communication unit, and the processing unit and the communication unit may perform corresponding functions in any design example in the first aspect. Specifically, the communication unit is configured to send AI data to an AI device, and the communication unit is further configured to receive first indication information from the AI device. The first indication information is determined based on the AI data. Optionally, the processing unit is configured to generate the AI data and the like. For specific execution processes of the processing unit and the communication unit, refer to the first aspect. Details are not described herein again.

According to a sixth aspect, an apparatus is provided. For beneficial effects, refer to the description of the first aspect. The apparatus includes a processor, configured to implement the method described in the first aspect. The apparatus may further include a memory, configured to store instructions and/or data. The memory is coupled to the processor. When executing program instructions stored in the memory, the processor can implement the method described in the first aspect. The apparatus may further include a communication interface, and the communication interface is used by the apparatus to communicate with another device. For example, the communication interface may be a transceiver, a circuit, a bus, a module, a pin, or a communication interface of another type, and the other device may be an AI device, a terminal device, or the like. In a possible design, the apparatus includes:

- the memory, configured to store program instructions;
- the processor, configured to generate AI data; and
- the communication interface, configured to send the AI data to the AI device and receive first indication information from the AI device. The first indication information is determined based on the AI data.

For specific execution processes of the communication interface and the processor, refer to the description of the first aspect. Details are not described again.

According to a seventh aspect, an apparatus is provided. For beneficial effects, refer to the description of the second aspect. The apparatus may be an AI device, or may be an apparatus in an AI device, or an apparatus that can be used together with an AI device. In a design, the apparatus includes units that are in a one-to-one correspondence with the methods/operations/steps/actions described in the second aspect. The units may be implemented by a hardware circuit, or may be implemented by software, or may be implemented by a hardware circuit in combination with software. For example, the apparatus may include a processing unit and a communication unit, and the processing unit and the communication unit may perform corresponding functions in any design example in the second aspect. Specifically, the communication unit is configured to receive AI data from a network device; the processing unit is configured to determine first indication information based on the AI data; and the communication unit is further configured to send the first indication information to the network device. For specific execution processes of the processing unit and the communication unit, refer to the second aspect. Details are not described herein again.

According to an eighth aspect, an apparatus is provided. For beneficial effects, refer to the description of the second aspect. The apparatus includes a processor, configured to implement the method described in the second aspect. The apparatus may further include a memory, configured to store instructions and/or data. The memory is coupled to the processor. When executing the program instructions stored in the memory, the processor can implement the method described in the second aspect. The apparatus may further include a communication interface, and the communication interface is used by the apparatus to communicate with another device. For example, the communication interface may be a transceiver, a circuit, a bus, a module, a pin, or a communication interface of another type, and the other device may be a network device, or the like. In a possible design, the apparatus includes:

- the memory, configured to store program instructions;
- the communication interface, configured to receive AI data from the network device;
- the processor, configured to determine first indication information based on the AI data; and
- the communication interface, configured to send the first indication information to the network device.

For specific execution processes of the communication interface and the processor, refer to the description of the second aspect. Details are not described again.

According to a ninth aspect, an apparatus is provided. For beneficial effects, refer to the description of the third aspect. The apparatus may be a network device, or may be an apparatus in a network device, or may be an apparatus that can be used together with a network device. In a design, the apparatus includes units that are in a one-to-one correspondence with the methods/operations/steps/actions described in the third aspect. The units may be implemented by a hardware circuit, or may be implemented by software, or may be implemented by a hardware circuit in combination with software. For example, the apparatus may include a processing unit and a communication unit, and the processing unit and the communication unit may perform corresponding functions in any design example in the third aspect. Specifically, the communication unit is configured to receive target information from a terminal device; and the processing unit is configured to determine first indication information based on the target information of the terminal device. For specific execution processes of the processing unit and the communication unit, refer to the third aspect. Details are not described herein again.

According to a tenth aspect, an apparatus is provided. For beneficial effects, refer to the description of the third aspect. The apparatus includes a processor, configured to implement the method described in the third aspect. The apparatus may further include a memory, configured to store instructions and/or data. The memory is coupled to the processor. When executing program instructions stored in the memory, the processor can implement the method described in the third aspect. The apparatus may further include a communication interface, and the communication interface is used by the apparatus to communicate with another device. For example, the communication interface may be a transceiver, a circuit, a bus, a module, a pin, or a communication interface of another type, and the other device may be a terminal device, or the like. In a possible design, the apparatus includes:

- the memory, configured to store program instructions;
- the communication interface, configured to receive target information from the terminal device; and
- the processor, configured to determine first indication information based on target information of the terminal device.

For specific execution processes of the communication interface and the processor, refer to the description of the third aspect. Details are not described again.

According to an eleventh aspect, an apparatus is provided. For beneficial effects, refer to the description of the fourth aspect. The apparatus may be a terminal device, or may be an apparatus in a terminal device, or an apparatus that can be used together with a terminal device. In a design, the apparatus includes units that are in a one-to-one correspondence with the methods/operations/steps/actions described in the fourth aspect. The units may be implemented by a hardware circuit, or may be implemented by software, or may be implemented by a hardware circuit in combination with software. For example, the apparatus may include a processing unit and a communication unit, and the processing unit and the communication unit may perform corresponding functions in any one of the design examples in the fourth aspect. Specifically, the communication unit is configured to send target information to a network device. In the method, the target information is used by the network device or an AI device to determine an energy saving policy. Optionally, the processing unit is configured to determine the target information. For specific execution processes of the processing unit and the communication unit, refer to the fourth aspect. Details are not described herein again.

According to a twelfth aspect, an apparatus is provided. For beneficial effects, refer fourth description of the fourth aspect. The apparatus includes a processor, configured to implement the method described in the fourth aspect. The apparatus may further include a memory, configured to store instructions and/or data. The memory is coupled to the processor. When executing the program instructions stored in the memory, the processor can implement the method described in the fourth aspect. The apparatus may further include a communication interface, and the communication interface is used by the apparatus to communicate with another device. For example, the communication interface may be a transceiver, a circuit, a bus, a module, a pin, or a communication interface of another type, and the other device may be a network device, or the like. In a possible design, the apparatus includes:

- the memory, configured to store program instructions;
- the processor, configured to generate target information; and
- the communication interface, configured to send the target information to the network device. The target information is used by the network device or an AI device to determine an energy saving policy.

For specific execution processes of the communication interface and the processor, refer to the description of the fourth aspect. Details are not described again.

According to a thirteenth aspect, an embodiment of this application further provides a computer-readable storage medium, including instructions. When the instructions are run on a computer, the computer is enabled to perform the method according to any one of the first aspect or the possible designs of the first aspect.

According to a fourteenth aspect, an embodiment of this application further provides a computer-readable storage medium, including instructions. When the instructions are run on a computer, the computer is enabled to perform the method according to any one of the second aspect or the possible designs of the second aspect.

According to a fifteenth aspect, an embodiment of this application further provides a computer-readable storage medium, including instructions. When the instructions are run on a computer, the computer is enabled to perform the method according to any one of the third aspect or the possible designs of the third aspect.

According to a sixteenth aspect, an embodiment of this application further provides a computer-readable storage medium, including instructions. When the instructions are run on a computer, the computer is enabled to perform the method according to any one of the fourth aspect or the possible designs of the fourth aspect.

According to a seventeenth aspect, an embodiment of this application further provides a chip system. The chip system includes a processor, and may further include a memory, and is configured to implement the method according to any one of the first aspect or the possible designs of the first aspect. The chip system may include a chip, or may include a chip and another discrete component.

According to an eighteenth aspect, an embodiment of this application further provides a chip system. The chip system includes a processor, and may further include a memory, to implement the method according to any one of the second aspect or the possible designs of the second aspect. The chip system may include a chip, or may include a chip and another discrete component.

According to a nineteenth aspect, an embodiment of this application further provides a chip system. The chip system includes a processor, and may further include a memory. The chip system is configured to implement the method according to any one of the third aspect or the possible designs of the third aspect. The chip system may include a chip, or may include a chip and another discrete component.

According to a twentieth aspect, an embodiment of this application further provides a chip system. The chip system includes a processor, and may further include a memory, to implement the method according to any one of the fourth aspect or the possible designs of the fourth aspect. The chip system may include a chip, or may include a chip and another discrete component.

According to a twenty-first aspect, an embodiment of this application further provides a computer program product, including instructions, and when the instructions are run on a computer, the computer is enabled to perform the method according to any one of the first aspect or the possible designs of the first aspect.

According to a twenty-second aspect, an embodiment of this application further provides a computer program product, including instructions. When the instructions are run on a computer, the computer is enabled to perform the method in any one of the second aspect or the possible designs of the second aspect.

According to a twenty-third aspect, an embodiment of this application further provides a computer program product, including instructions. When the instructions are run on a computer, the computer is enabled to perform the method in any one of the third aspect or the possible designs of the third aspect.

According to a twenty-fourth aspect, an embodiment of this application further provides a computer program product, including instructions. When the instructions are run on a computer, the computer is enabled to perform the method according to any one of the fourth aspect or the possible designs of the fourth aspect.

According to a twenty-fifth aspect, an embodiment of this application further provides a system, where the system includes the apparatus according to the fifth aspect or the sixth aspect, and the apparatus according to the seventh aspect or the eighth aspect. Optionally, the apparatus further includes the apparatus according to the eleventh aspect or the twelfth aspect.

According to a twenty-sixth aspect, an embodiment of this application further provides a system, where the system includes the apparatus according to the ninth aspect or the tenth aspect and the apparatus according to the eleventh aspect or the twelfth aspect.

DESCRIPTION OF EMBODIMENTS

Figure 1:
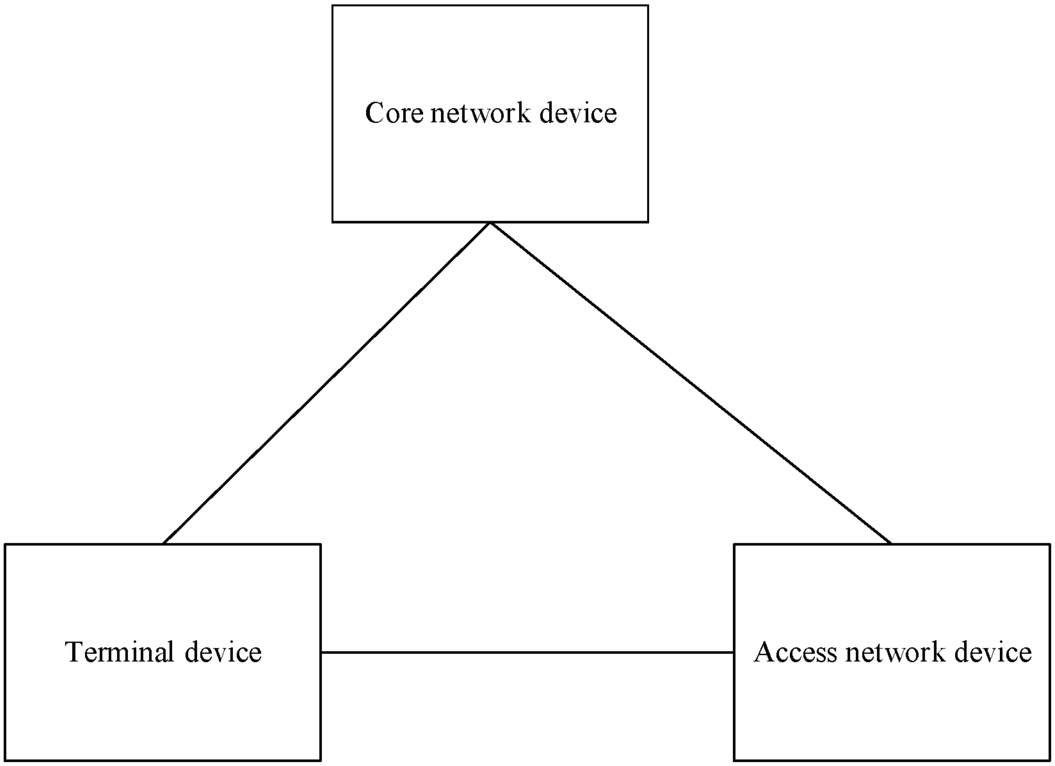
FIG. 1 is a schematic diagram of a network architecture according to an embodiment of this application.

FIG. 1 is an example diagram of a network architecture to which an embodiment of this application can be applied. The network architecture includes a core network (CN) device and an access network device. The access network device and the core network device may communicate with each other through a next generation (NG) interface, and different access network devices may communicate with each other through an Xn interface.

In embodiments of this application, the access network device may also be referred to as a radio access network (RAN) device, and is a device that connects a terminal device to a wireless network. The access network device may provide functions such as radio resource management, quality of service management, and data encryption and/or data compression for the terminal device. The access network device includes but is not limited to:

a base station, a next generation NodeB (gNB) in 5G, an evolved NodeB (eNB), a radio network controller (RNC), a NodeB (NB), a base station controller (base station controller, BSC), a base transceiver station (BTS), a home evolved NodeB or a home NodeB (HNB), a baseband unit (BBU), a transmitting and receiving point (TRP), a transmitting point (TP), a mobile switching center, and/or the like. Alternatively, the access network device may be at least one of a radio controller, a central unit (CU), a distributed unit (DU), a central unit control plane (CU-CP) node, a central unit user plane (CU-UP) node, or an integrated access and backhaul (IAB) node in a cloud radio access network (CRAN) scenario. Alternatively, the access network device may be a relay station, an access point, an in-vehicle device, a terminal device, a wearable device, an access network device in a future 5G network, an access network device in a future evolved public land mobile Network (PLMN), or the like.

In embodiments of this application, an apparatus configured to implement a function of an access network device may be an access network device, or may be an apparatus, for example, a chip system, that can support the access network device in implementing the function. The apparatus may be installed in the access network device or may be used together with the access network device. In embodiments of this application, the chip system may include a chip, or may include a chip and another discrete component. In the technical solutions provided in embodiments of this application, the technical solutions provided in embodiments of this application are described by using an example in which the apparatus configured to implement the function of the access network device is the access network device.

The core network device is mainly configured to: manage a terminal device and provide a gateway for communication with an external network. Optionally, in embodiments of this application, an apparatus configured to implement a function of a core network device may be a core network device, or may be an apparatus, for example, a chip system, that can support the core network device in implementing the function. The apparatus may be installed in the core network device or may be used together with the core network device. In the technical solutions provided in embodiments of this application, the technical solutions provided in embodiments of this application are described by using an example in which the core network device is the apparatus for implementing the function of the core network device.

Optionally, the network architecture shown in FIG. 1 may further include a terminal device. The terminal device may be referred to as a terminal for short, and is a device having a wireless transceiver function. The terminal device may be mobile or fixed. The terminal device may be deployed on land, where the deployment includes indoor or outdoor, or handheld or vehicle-mounted deployment, may be deployed on water (for example, on a ship), or may be deployed in air (for example, on aircraft, a balloon, or a satellite). The terminal device may be a mobile phone, a pad, a computer with a wireless transceiver function, a virtual reality (VR) terminal device, an augmented reality (AR) terminal device, a wireless terminal device in industrial control, a wireless terminal device in self-driving, a wireless terminal device in remote medical, a wireless terminal device in a smart grid, a wireless terminal device in transportation safety, a wireless terminal device in a smart city, and/or a wireless terminal device in a smart home. Alternatively, the terminal device may be a cellular phone, a cordless phone, a session initiation protocol (SIP) phone, a wireless local loop (WLL) station, a personal digital assistant (PDA), a handheld device or a computing device with a wireless communication function, an in-vehicle device, a wearable device, a terminal device in a future fifth generation (the $5^{th}$ generation, 5G) network, a terminal device in a future evolved public land mobile communication network (PLMN), or the like. The terminal device may also be sometimes referred to as user equipment (UE). The terminal device may communicate with a plurality of access network devices that use different technologies. For example, the terminal device may communicate with an access network device that supports long term evolution (LTE), or may communicate with an access network device that supports 5G, or may implement dual connectivity to an access network device that supports LTE and an access network device that supports 5G. This is not limited in embodiments of this application.

In embodiments of this application, an apparatus configured to implement functions of the terminal device may be a terminal device, or may be an apparatus, for example, a chip system, that can support the terminal device in implementing the function. The apparatus may be deployed on the terminal device, or may be used together with the terminal device. The technical solutions provided in embodiments of this application are described by using an example in which the apparatus configured to implement the function of the terminal device is the terminal device.

Figure 2:
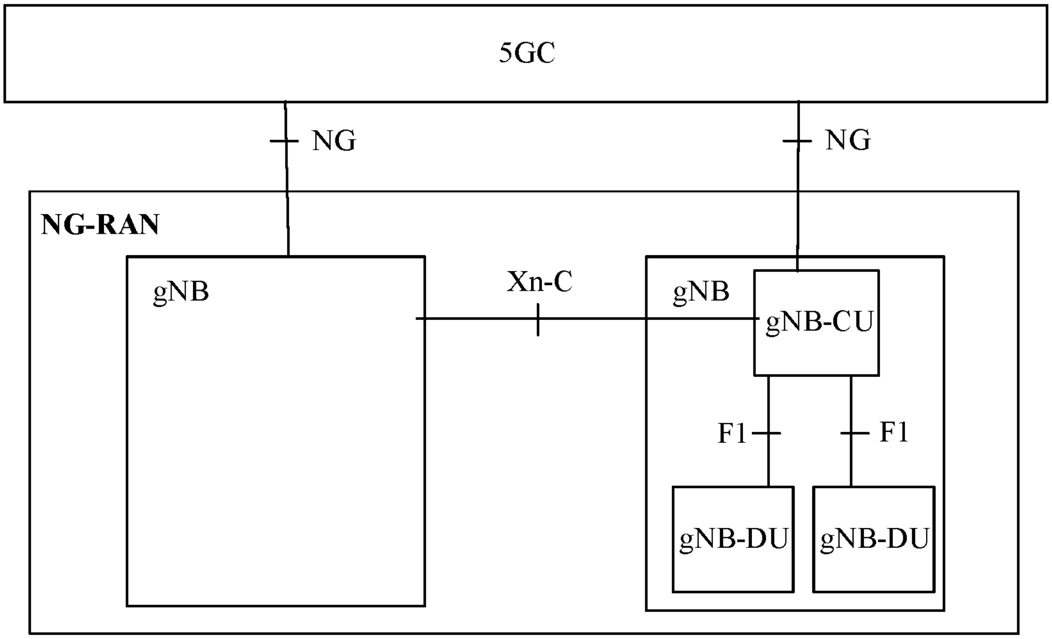
FIG. 2 is another schematic diagram of a network architecture according to an embodiment of this application.

In a possible implementation, as shown in FIG. 2, a core network in the 5G system may also be referred to as a fifth generation core network ($5^{th}$ generation core network, 5GC), and the access network may also be referred to as a next generation radio access network (NG-RAN). The NG-RAN includes one or more base stations. An example in which the base station is a gNB is used. The gNB in the NG-RAN may be an independent network element gNB, or may be a gNB including a central unit (CU) and a distributed unit (DU). A CU in the gNB may be denoted as a gNB-CU, and a DU in the gNB may be denoted as a gNB-DU. An interface between the gNB-CU and the gNB-DU is an F1 interface. One gNB-DU may be connected to one or more gNB-CUs, and one gNB-CU may be connected to one or more gNB-DUs. The gNB-CU and the gNB-DU connected to the gNB-CU are considered as one gNB for another gNB and the CN.

Figure 3:
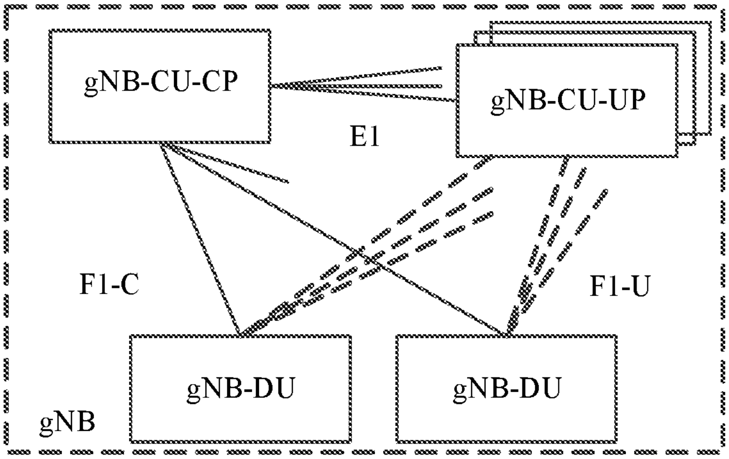
FIG. 3 is still another schematic diagram of a network architecture according to an embodiment of this application.

As shown in FIG. 3, the gNB-CU may further include two network elements: a gNB-CU-control plane (CP) and a gNB-CU-user plane (UP). An interface between the gNB-CU-CP and the gNB-CU-UP is an E1 interface, an interface between the gNB-CU-CP and the gNB-DU is an F1-C interface, and an interface between the gNB-CU-UP and the gNB-DU is an F1-U interface. One gNB-DU may be connected to one or more gNB-CU-UPs, and one gNB-CU-UP may be connected to one or more gNB-DUs.

Figure 4:
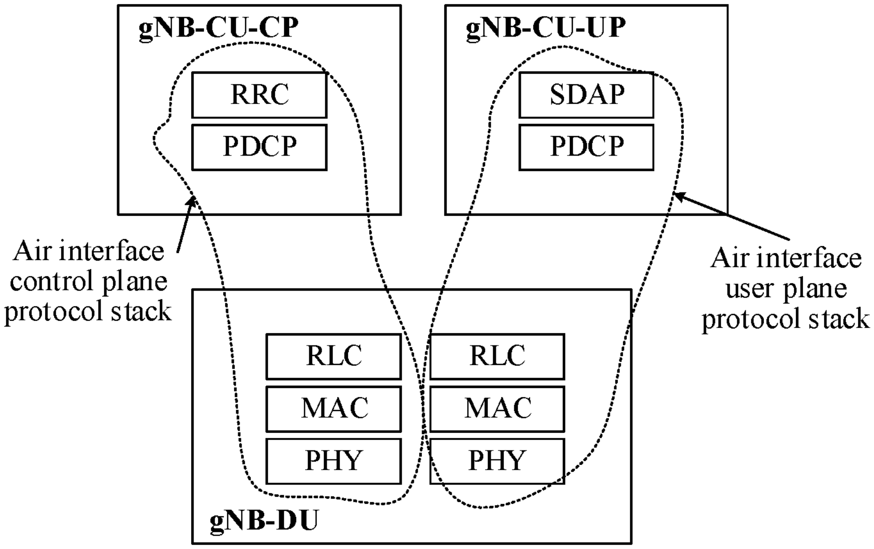
FIG. 4 is a schematic diagram of a protocol layer according to an embodiment of this application.

FIG. 4 is a schematic diagram of possible distribution of an air interface protocol stack when a gNB has CU/DU separate and a gNB-CU further has CU/UP separation. In the example shown in FIG. 4, for both a user plane and a control plane, in an air interface protocol stack, a radio link control (RLC) protocol layer, a media access control (MAC) protocol layer, and a physical (PHY) protocol layer are distributed in a gNB-DU, and a packet data convergence protocol (PDCP) protocol layer and higher protocol layers are distributed in a gNB-CU. For example, on a control plane, a PDCP protocol layer and a radio resource control (RRC) protocol layer are distributed in a gNB-CU-CP; and on a user plane, a PDCP protocol layer and a service data adaptation protocol (SDAP) layer are distributed in a gNB-CU-UP. The RRC protocol layer may implement air interface radio resource and air interface connection control, and the SDAP protocol layer may perform mapping between a quality of service flow (QoS-flow) and a data radio bearer (DRB). Functions of other protocol layers are not described again. For details, refer to the 3GPP protocol specification TS 38.300.

In a current mobile network, network planning, network configuration, and resource scheduling are increasingly complex, and network consumption increases significantly, which imposes a higher requirement on energy saving of the network. In a possible energy saving mechanism, a base station or an operations, administration, and maintenance (OAM) system makes an energy saving decision by using human experience or a simple algorithm and implements the decision, which has disadvantages such as long time consumption, high costs, and poor adaptability of self-optimization and a scheduling algorithm, and cannot satisfy a high requirement of energy saving of the network.

Embodiments of this application provide a communication method and an apparatus, to satisfy a high requirement of energy saving of a network. The method includes: An artificial intelligence (AI) device determines an energy saving policy based on collected AI data. The AI device notifies an access network device of the energy saving policy. The access network device performs an energy saving operation according to the energy saving policy. Compared with a solution in which an access network device or an OAM system determines an energy saving policy by using human experience or a simple algorithm and implements the energy saving policy, an intelligent energy saving mechanism of a network can be implemented, and a high requirement of energy saving of the network can be satisfied.

Optionally, the AI device may be introduced in the network architecture shown in FIG. 1. The AI device may also be referred to as an AI module, an AI platform, a radio intelligent controller (RIC), a first module, or the like. For ease of description, the AI device is used as an example for description. The AI device may be independently deployed, or may be integrated into the access network device or a core network device. When the AI device is integrated into the access network device, the AI device described in the following embodiments may be replaced with the access network device. When the AI device is integrated into the core network device, the AI device described in the following embodiments may be replaced with the core network device. In a possible manner, the functions of the AI device may include two parts: an AI training (training) function and an AI inference (inference) function. The foregoing two parts of functions may be deployed on a same device, or may be deployed on different devices. This is not limited.

In embodiments of this application, if the AI device is independently deployed, an apparatus configured to implement a function of the AI device may be an AI device, or may be an apparatus, for example, a chip system, that can support the AI device in implementing the function. The apparatus may be installed in the AI device or may be used together with the AI device. The technical solutions provided in embodiments of this application are described by using an example in which the apparatus configured to implement the function of the AI device is the AI device.

It should be noted that the network architecture and the service scenario described in embodiments of this application are intended to describe the technical solutions in embodiments of this application more clearly, and do not constitute a limitation on the technical solutions provided in embodiments of this application. A person of ordinary skill in the art may learn that the technical solutions provided in embodiments of this application are also applicable to a similar technical problem as a network architecture evolves and a new service scenario emerges.

It may be understood that, in embodiments of this application, at least one of the terminal device, the network device, the AI device, or the like may perform some or all of the steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application may be performed.

In the descriptions of this application, "/" indicates that associated objects are in an "or" relationship unless otherwise specified. For example, A/B may represent A or B. In this application, "and/or" describes only an association relationship for describing associated objects and represents that three relationships may exist. For example, A and/or B may represent the following three cases: Only A exists, both A and B exist, and only B exists, where A and B may be singular or plural. In addition, in descriptions of this application, unless otherwise specified, "a plurality of" means two or more than two. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. For another example, this phrase "at least one of the following: a, b, and c" may be interpreted to mean the same as "at least one of the following: a, b, or c". In addition, to clearly describe the technical solutions in embodiments of this application, terms such as first and second are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

Network elements in embodiments of this application include an access network device, a terminal device, a core network element, an AI device, and the like. The access network device may be of a CU/DU architecture. In this case, the access network device includes two network elements: a CU and a DU. Alternatively, the access network device may be of a CP-UP architecture. In this case, the access network device includes three network elements: a CU-CP, a CU-UP, and a DU. The AI device may be independently deployed, or may be integrated into an access network device or a core network device. This is not limited.

Embodiment 1

An embodiment of this application provides a communication method. The communication method is described by using an example in which an AI device is independently deployed, and includes: An access network device sends AI data to the AI device. The AI device determines an energy saving policy based on the AI data, and sends the energy saving policy to the access network device. Optionally, the energy saving policy indicates at least one of the following: an energy saving area (ESA) to which a cell served by the access network device belongs; and an energy saving priority of each cell in the ESA. The AI data may also be referred to as $x1^{th}$ data or another name, and x1 is a positive integer. For example, the AI data is referred to as first data. The ESA may also be referred to as a $y1^{th}$ area or another name, where y1 is a positive integer. For example, the ESA is referred to as a first area.

Figure 5:
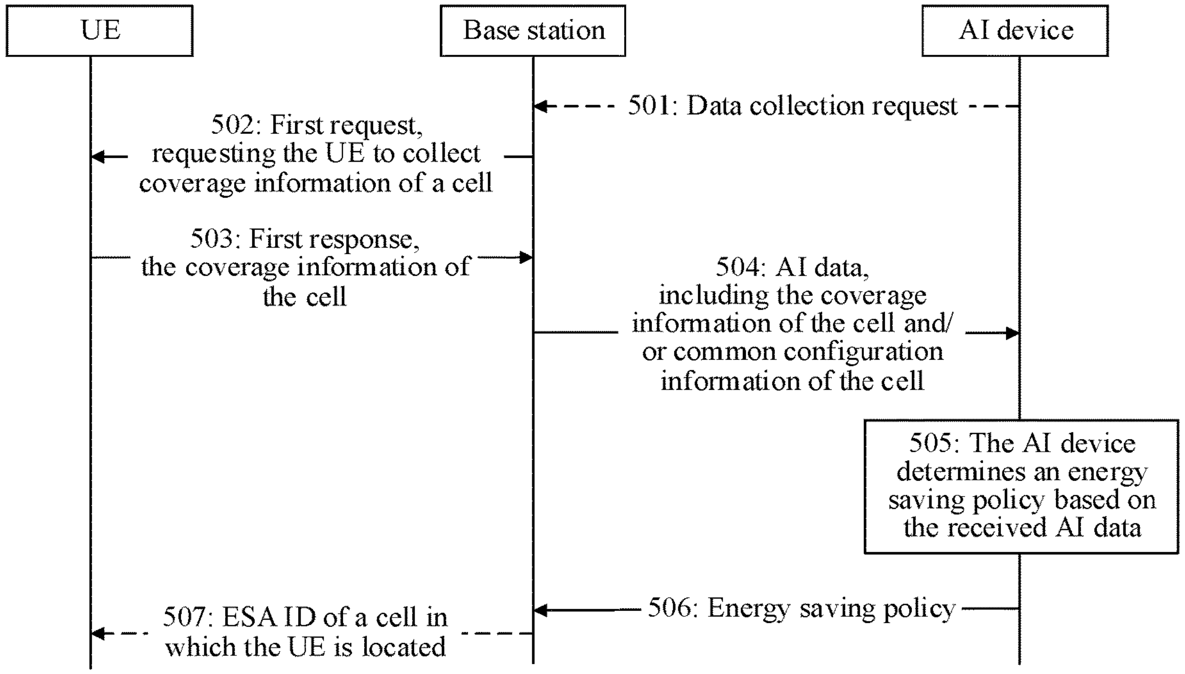
FIG. 5 is a flowchart of a communication method according to an embodiment of this application.

For ease of understanding, an example in which the access network device is a base station and the terminal device is UE is used for description. As shown in FIG. 5, a procedure of a communication method is provided, including the following steps.

Step 501: An AI device sends a data collection request to a base station. To-be-collected data may be referred to as AI data, and is used to determine energy saving information. The data collection request may be referred to as an energy saving information collection request, and the energy saving information collection request is for requesting the base station to collect AI data for energy saving of a cell served by the base station. The cell served by the base station may also be referred to as a cell managed by the base station. The AI data for energy saving includes at least one of the following:

1. Coverage information of the cell. Optionally, the coverage information of the cell may be collected by the base station, or collected and reported by UE to the base station, or part of information is collected by the base station and part of information is collected and reported by UE to the base station. The coverage information of the cell may include at least one of the following:
   Position information of UE in the cell.
   Beam information measured by the UE. Optionally, the beam information may include a beam identifier, beam quality, and the like.
   Cell quality information measured by the UE. Optionally, the UE may obtain the cell quality information by measuring one or more of a downlink synchronization signal, a channel state information reference signal (CSI-RS), a demodulation reference signal (DMRS), a cell reference signal (CRS), a synchronization signal/physical broadcast channel block (SS/PBCH Block, SSB), or another downlink signal. The cell quality information may include at least one of the following: received signal code power (RSCP), reference signal received power (RSRP), reference signal received quality (RSRQ), a signalto-noise ratio (SNR), a signal to interference plus noise ratio (SINR), a reference signal strength indicator (RSSI), and other signal quality of the UE in the cell. Optionally, the quality of the cell may be at a cell level, a beam level, an SSB level, a CSI-RS level, an air interface technology (numerology) level, a slice level, or a bandwidth part (BWP) level. It may be understood that, if the cell quality information is at a beam level, an SSB level, an air interface technology level, a slice level, a BWP level, or the like, the cell quality information may further include an identifier of a corresponding beam, SSB, CSI-RS, air interface technology, slice, BWP, or the like.

Time information. Optionally, the time information may be specifically a time at which the UE records the coverage information of the cell, or a time interval between recording of the coverage information of the cell by the UE and reporting of the coverage information of the cell by the UE. For example, the UE records the coverage information of the cell at 8:56:50 on Sep. 3, 2020, and reports the coverage information of the cell to the base station at 8:59:50 on Sep. 3, 2020. In this case, the time information may be specifically 8:56:50 on Sep. 3, 2020, or may be a time interval of three minutes between the recording of the coverage information of the cell by the UE and the reporting of the coverage information of the cell by the UE.

Cell identifier information. Optionally, the cell identity information may include at least one of a cell global identifier (CGI), a physical cell identifier (PCI), a frequency, a cell identifier (cell identifier), a non-public network identifier (NPN ID), a non-terrestrial network identifier (NTN ID), or another cell identifier of the cell. Further, the cell identity information may further include a tracking area code (TAC).

Coverage level information of the cell, indicating a coverage configuration of the cell. For example, the coverage level information of the cell may include a total of 16 levels 0 to 15, and different levels correspond to different coverage configurations of the cell. The coverage configuration includes a coverage radius, a downlink transmit power of a cell, and/or the like.

2. Common configuration information of the cell. Optionally, the common configuration information of the cell may be collected by the base station. The common configuration information of the cell may include common configuration information of at least one cell served by the base station. The common configuration information of the cell may be a common configuration parameter of the cell, and is generally not affected by a service/load change of the cell. The common configuration information of the cell may include at least one of the following:

First common configuration information. Optionally, the first common configuration information is information for evaluating power consumption of the cell. The first common configuration information may include at least one of the following: a period of an SSB, a period of a master information block (MIB), a period of a system message block 1 (SIB1), a period of a system message that needs to be broadcast and sent, a period of a broadcast system message, paging configuration information, configuration information of a random access resource, a quantity of SSB beams of the cell, a quantity of antennas of the cell, a maximum transmit power of the cell, and the like. The quantity of antennas may be a quantity of physical antennas, or may be a quantity of antenna ports, and is not limited. The paging configuration information may indicate a parameter for determining a paging frame and/or a paging occasion, for example, a paging cycle or a paging occasion offset. The configuration information of a random access resource may indicate a time domain resource and/or a frequency domain resource for random access.

Second common configuration information. Optionally, the second common configuration information is information for evaluating a service capability of the cell. The second common configuration information may include at least one of the following: a subcarrier spacing supported by the cell, for example, all subcarrier spacings supported by the cell; and a slice type supported by the cell. The slice type may also be referred to as a service type. The slice type supported by the cell may include at least one of the following: mobile broadband (MBB), enhanced mobile broadband (eMBB), massive machine type communications (mMTC), ultra-reliable and low latency communications (URLLC), narrow band internet of things (NB-IoT), and enhanced machine-type communication (eMTC), and the like.

It should be noted that step 501 is optional, that is, the base station does not need to collect and report AI data each time after receiving an energy saving information collection request sent by the AI device. The base station may automatically collect and report AI data according to a rule, for example, a rule specified in a protocol. For example, the base station may periodically collect and report AI data.

Step 502: The base station sends a first request to the UE, where the first request is for requesting the UE to collect the coverage information of the cell.

The first request may indicate a type of data collected by the UE and/or a manner in which the UE reports the collected data. Alternatively, a type of data collected by the UE and/or a manner in which the UE reports the collected data may be specified in a protocol.

The type of data that needs to be collected by the UE may be one or more types of data. In embodiments of this application, a manner in which the UE or the base station reports the collected data may be an event-triggered manner or periodic reporting. Reporting manners of different data may be the same or may be different. This is not limited.

Optionally, the coverage information of the cell (first coverage information of the cell) that needs to be collected by the UE in step 502 is a part or all of the coverage information of the cell (second coverage information of the cell) in step 501. For example, the coverage information of the cell in step 501 includes N1 parameters, and the coverage information of the cell in step 502 includes N2 parameters, where N1 and N2 are positive integers, and N1 is greater than or equal to N2.

Step 503: The UE sends a first response to the base station, where the first response carries the coverage information of the cell collected by the UE.

Step 504: The base station sends the collected AI data to the AI device, where the AI data may include the coverage information of the cell and/or the common configuration information of the cell. It may be understood that the coverage information of the cell and the common configuration information of the cell may be carried in a same message, or may be carried in different messages. If the coverage information of the cell and the common configuration information of the cell are carried in different messages, the step in which the base station sends the common configuration information of the cell to the AI device may be performed at any moment after step 501. This is not limited to step 504.

It may be understood that, if the base station in embodiments of this application includes a CU, a DU, and the like, the base station may further perform the following steps: The CU sends a request to the DU, to request the DU to collect the common configuration information of the cell. The CU receives the common configuration information of the cell sent by the DU.

It should be noted that the base station may serve one or more cells. Each cell corresponds to coverage information of the cell and/or common configuration information of the cell. The base station may separately report the coverage information and/or the common configuration information of each cell to the AI device, or the base station may centrally report coverage information and/or common configuration information of a plurality of cells to the AI device. This is not limited in the present disclosure. For example, the base station serves three cells, and the base station may separately report coverage information and/or common configuration information of each cell three times, or the base station may report coverage information and/or common configuration information of three cells at once. Optionally, the AI data reported by the base station may further include an identifier of the base station. Further, the AI data corresponding to each cell may further include an identifier of the cell.

Figure 6:
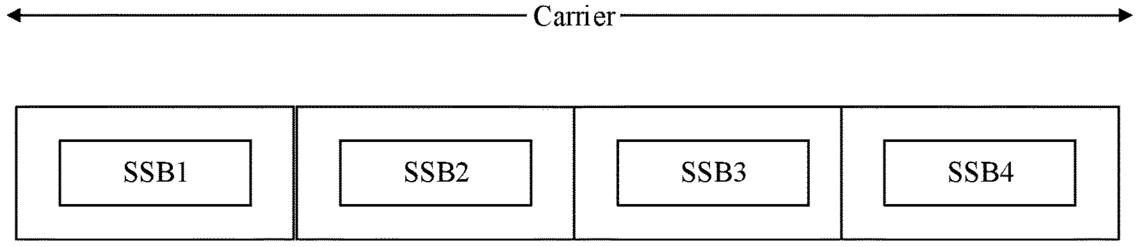
FIG. 6 shows a correspondence between a carrier and an SSB according to an embodiment of this application.

In a possible implementation, the base station reports the common configuration information of the cell to the AI device with a granularity of carrier. A plurality of SSBs can be configured on one carrier. For example, in a new radio (NR) system, as shown in FIG. 6, four SSBs may be configured on one carrier, and the four SSBs are respectively numbered 1 to 4. From a perspective of the UE, it may be understood that one SSB corresponds to one cell. The common configuration information of the cell with a granularity of carrier is indicated, so that the AI device can determine cells on a same carrier, thereby better making an energy saving decision. For example, cells on the same carrier can be preferentially shut down to implement carrier-level shutdown. FIG. 6 is used as an example. If the AI device knows a relationship between a carrier and the common configuration information of the cell, when making an energy saving decision, the AI device may determine to disable the SSB1 to the SSB4. In this way, the base station may disable the carrier. If the AI device does not know a correspondence between the carrier and the common configuration information of the cell, the AI device may determine to disable some cells on a carrier 1 and some cells on a carrier 2, and finally the base station cannot disable one carrier thoroughly. It may be understood that, if the base station reports the common configuration information of the cell to the AI device with a granularity of carrier, in addition to the common configuration information of the cell, the base station may further need to report information about a carrier corresponding to the common configuration information of the cell, for example, an identifier of the carrier, configuration information (for example, frequency information/bandwidth information of a carrier) of the carrier, and group information of the cell. One carrier may include at least one cell group, and one cell group includes one or more cells. If two cells belong to the same cell group, the two cells belong to the same carrier.

In another possible implementation, the base station reports the common configuration information of the cell to the AI device with a granularity of hardware unit. The hardware unit may be at least one of a power amplifier, a radio frequency unit, or a baseband processing unit. For example, one baseband processing unit may be configured with a plurality of carriers or a plurality of cells. It may be understood that at least one cell may be configured on one carrier. The base station may indicate, to the AI device, common configuration information of a cell with a granularity of hardware unit, so that the AI device determines cells on one same hardware unit, thereby better making an energy saving decision. For example, a cell on a same hardware unit may be preferentially shut down, to implement hardware unit-level shutdown as much as possible, and save energy of the base station as much as possible. It may be understood that, if the base station reports the common configuration information of the cell to the AI device with a granularity of hardware unit, in addition to reporting the common configuration information of the cell, the base station may further need to report information about the hardware unit, for example, an identifier of the hardware unit or group information of the cell. One hardware unit may include at least one cell group, and one cell group includes one or more cells. If two cells belong to the same cell group, the two cells belong to the same hardware unit.

Step 505: The AI device determines an energy saving policy based on the received AI data.

For example, the functions of the AI device may include two parts: an AI training function and an AI inference function. AI training is a processing process. In this processing process, the AI device uses a training method, so that an AI model learns to perform a specific task, to obtain the AI model. A possible training method includes supervised learning, unsupervised learning, reinforcement learning, transfer learning, and the like, which is not limited. Supervised learning is training using a group of training samples that have been correctly labeled. The foregoing "correctly labeled" means that each sample has an expected output value. Unlike supervised learning, unsupervised learning is a method that automatically classifies or groups input data without giving a pre-marked training sample. Reinforcement learning is a field of machine learning that focuses on how to act based on the environment to maximize expected benefits. Transfer learning is a research field of machine learning. Transfer learning focuses on storing a solution model of existing problems and using the solution model on other different but related problems. For example, knowledge (or models) used to identify cars may also be used to improve the ability to identify trucks. AI inference refers to using AI models to execute tasks. AI processing is performed on an actual input to obtain a corresponding prediction result.

In embodiments of this application, the AI device may pre-train the AI data that includes the coverage information and/or the common configuration information of the cell, to obtain an AI model; or the AI device may obtain configuration information of an AI model by using OAM, and determine the AI model based on the configuration information of the AI model. Subsequently, the AI device may input the AI data reported by the base station into the AI model, to obtain the energy saving policy. Optionally, the obtained energy saving policy may include at least one of the following: an ID of an ESA to which a cell served by the base station belongs, and energy saving priority information of each cell in the ESA.

Figure 7:
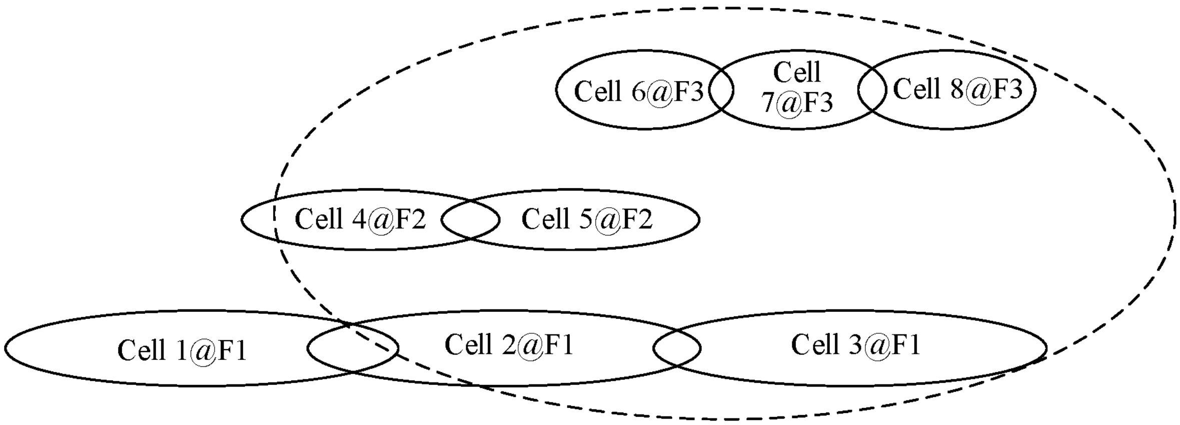
FIG. 7 is a schematic diagram of an ESA according to an embodiment of this application.

In a possible implementation, as shown in FIG. 7, one ESA may include three layers of frequencies, and the three layers of frequencies may correspond to coverage at a same geographical position. The three layers of frequencies are an F1 layer of frequencies, an F2 layer of frequencies, and an F3 layer of frequencies. For example, the F1 layer of frequencies may be smaller than those of the F2 layer of frequencies, and the F2 layer of frequencies may be smaller than those of the F3 layer of frequencies. The F1 layer may provide basic communication coverage, and the F1 layer includes a cell 1, a cell 2, and a cell 3. Coverage layers of the cell 1 and the cell 3 may include a cell 4 and a cell 5 on the F2 layer and a cell 6 to a cell 8 on the F3 layer.

Step 506: The AI device sends the energy saving policy to the base station, where the energy saving policy includes at least one of the following: the ID of the ESA to which the cell served by the base station belongs and the energy saving priority information, where the energy saving priority information indicates an energy saving priority of each cell in the ESA. For example, the energy saving policy sent by the AI device to the base station is "the ID of the ESA to which the cell served by the base station belongs". ESAs to which cells served by the base station belong may have the same ID or may have different IDs. For example, the base station serves five cells. An ID of an ESA to which a cell 1 to a cell 3 belong is ESA 1, an ID of an ESA to which a cell 4 belongs is ESA 2, and an ID of an ESA to which a cell 5 belongs is ESA 3. Therefore, the AI device may send the cell identity information and a corresponding ESA ID to the base station. That is, the energy saving policy may further include the cell identity information.

In a possible implementation, after the base station receives the ID of the ESA to which the cell served by the base station belongs from the AI device, the ID of the ESA to which the cell served by the base station belongs may be exchanged between different base stations. By using the foregoing mechanism, the base station may obtain ESA IDs of a plurality of cells, so that when making a handover decision (The handover decision refers to a serving cell of the UE. For example, as the UE moves, the UE moves from a coverage area of one cell to a coverage area of another cell, and in this case, a serving cell handover of the UE may be performed), the base station may consider an ESA ID of a target cell, for example, preferentially performs a handover within the ESA ID. For example, a current serving cell of the UE is a cell 1, and in a process of making a handover decision, target cells to which the base station may perform a handover include a cell a, a cell b, and a cell c. If an ESA ID of the cell 1 from which a handover is to be performed is 1 and ESA IDs of the cell a, the cell b, and the cell c are 1, 2, and 3 respectively, the base station may preferentially switch the serving cell of the UE to the cell a, so that the AI device conveniently performs energy saving management on the cell within the ESA ID. For example, ESAs whose ESA IDs are respectively 2 and 3 corresponding to the cell b and the cell c may be in an energy saving state or about to enter an energy saving state. If the UE is handed over to an ESA with a different ESA ID, an energy saving state in another ESA may be damaged, and the system energy consumption increases.

In another possible implementation, the AI device may further send, to the base station, identity information of a cell served by another base station within the ESA ID. In this way, the base station may obtain information about another cell within the ESA ID. Optionally, the AI device may further send, to the base station, an identifier of a base station to which the other cell belongs. Subsequently, when making a cell handover decision, the base station may also consider the ESA ID of the target cell. For example, the base station preferentially performs a handover within the ESA ID, so that the AI device conveniently performs energy saving management on the cell within the ESA ID.

In some embodiments, the AI device sends energy saving priority information to the base station, where the energy saving priority information indicates the energy saving priority of each cell in the ESA. Optionally, the energy saving priority information may be in the form of cell identity information and corresponding energy saving priority information, or may be in the form of frequency information and corresponding energy saving priority information, or may be in the form of a network type and corresponding energy saving priority information. Optionally, the energy saving priority information may be in the form of a cell identifier list, a frequency band list, or a network list. Priorities of elements in the list are arranged in descending order or ascending order. The network type may include a public land mobile network (PLMN ID), a non-public network (NPN), a non-terrestrial network (NTN), among other types. The private network may be classified into a closed access group (CAG), a standalone non-public network (SNPN), and the like. The base station may perform cell or base station handover of the UE based on the energy saving priority information. For example, if energy saving priority level information of a cell or base station is 0, it indicates that the cell or base station has the highest energy saving priority, that is, other base stations may avoid handing over the UE to this type of cell or base station.

Optionally, step 507: The base station sends an ESA ID of a cell in which the UE is located to the UE. For example, the base station may broadcast, to the UE by using system information such as an MIB or an SIB, the ESA ID of the cell in which the UE is located, or indicate, to the UE by using RRC signaling, a paging message, or the like, the ESA ID of the cell in which the UE is located.

It may be understood that, by using the foregoing mechanism, a base station of a neighboring cell may send, to the UE by using the system information, the ESA ID of the cell in which the UE is located. When the UE measures the neighboring cell, the UE may read the system information of the neighboring cell to obtain the ESA ID of the neighboring cell. The UE may report the ESA ID of the neighboring cell to the serving cell of the UE for the base station to which the serving cell belongs to make a handover decision. For example, after obtaining the ESA ID of the neighboring cell of the UE, the base station to which the serving cell belongs may preferentially switch from the current serving cell to the neighboring cell with the same ESA ID.

In embodiments of this application, the AI data used for energy saving is collected, so that the AI device can appropriately divide an energy saving area (ESA), and perform appropriate management based on the energy saving area (ESA). This reduces complexity of energy saving management performed by the AI device, and improves flexibility of an energy saving mechanism.

It may be understood that the foregoing description is provided by using an example in which the AI device is independently deployed. In practice, the AI device may be integrated into an access network device or a core network device. If the AI device is integrated into a core network device, the AI device in the foregoing description may alternatively be replaced with the core network device. If the AI device is integrated into an access network device, a procedure of the method may be replaced with: The access network device receives coverage information of a cell served by the access network device from the terminal device. The access network device determines an energy saving policy based on the coverage information of the cell. For example, the access network device may determine the energy saving policy based on the coverage information of the cell reported by the terminal device and common configuration information of the cell collected by the access network device. The energy saving policy indicates at least one of the following: an energy saving area (ESA) to which the cell served by the access network device belongs; and an energy saving priority of each cell in the ESA. Optionally, before the access network device receives coverage information of the cell served by the access network device from the terminal device, the method may further include: The access network device sends a first request to the terminal device, where the first request is for requesting the terminal device to collect the coverage information of the cell. Other processing processes are similar to the method described in the foregoing procedure in FIG. 5, and details are not described again.

Embodiment 2

This embodiment of this application provides a communication method. The method is described by using an example in which an AI device is independently deployed. The method includes: An access network device sends AI data to the AI device. The AI device determines an energy saving policy based on the AI data. The AI device sends the energy saving policy to the access network device. The energy saving policy includes at least one of the following: slot shutdown, power amplifier shutdown, carrier shutdown, cell shutdown, cell coverage adjustment, and load migration. The AI data may also be referred to as $x2^{th}$ data or another name, and x2 is a positive integer. For example, the AI data is referred to as second data.

Figure 8:
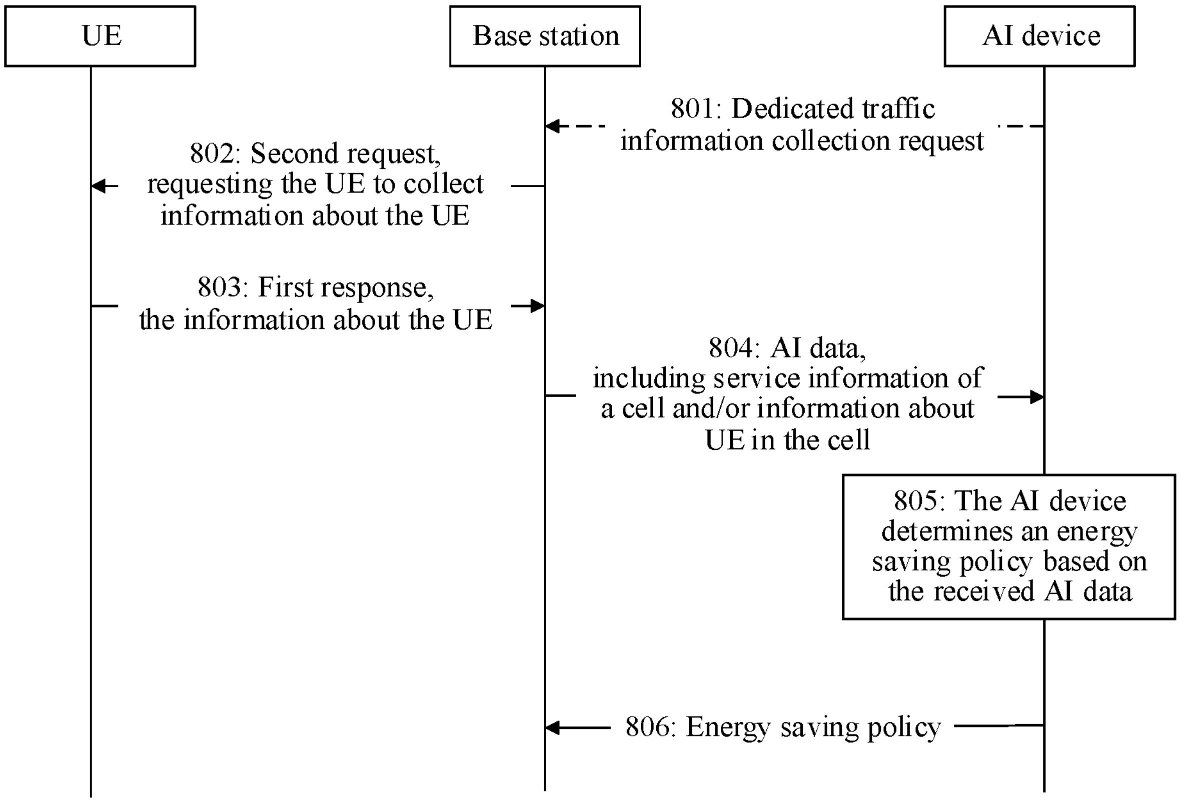
FIG. 8 is another flowchart of a communication method according to an embodiment of this application.

For ease of understanding, an example in which the access network device is a base station and the terminal device is UE is used for description. As shown in FIG. 8, a procedure of a communication method is provided, including the following steps.

Step 801: An AI device sends a request for collecting AI data related to dedicated traffic information to a base station, where the traffic information may also be referred to as dedicated traffic information. The dedicated traffic information may indicate service and/or resource usage of an active UE in a current cell. The dedicated traffic information may also be referred to as service information or another name, which is not limited. In embodiments of this application, the AI data related to the dedicated traffic information may be referred to as second data. The dedicated traffic information may be collected by the base station, or collected and reported by UE to the base station, or part of information is collected by the base station and part of information is collected and reported by UE to the base station.

It should be noted that step 801 is optional. After receiving the request for collecting the AI data related to the dedicated traffic information, the base station may collect and report the dedicated traffic information. Alternatively, the base station may automatically collect and report the dedicated traffic information according to a rule, for example, a rule specified in a protocol, for example, periodic collection and reporting.

Step 802: The base station sends a second request to the UE, where the second request is for requesting the UE to collect information about the UE.

Information that needs to be collected by the UE may be one or more types of data. The first request may indicate a type of data collected by the UE and/or a manner in which the UE reports the collected data. Alternatively, a type of data collected by the UE and/or a manner in which the UE reports the collected data may be specified in a protocol.

Optionally, the information that needs to be collected by the UE in step 802 is part or all of the dedicated traffic information in step 801. For example, the dedicated traffic information of the cell in step 801 includes N3 parameters, and the dedicated traffic information of the cell in step 802 includes N4 parameters, where N3 and N4 are positive integers, and N3 is greater than or equal to N4.

Step 803: The UE sends a second response to the base station, where the second response carries the information about the UE collected by the UE.

Step 804: The base station sends AI data related to the dedicated traffic information to the AI device. The AI data includes at least one of the following:

1. Service information of a cell served by a base station. The information may be collected and reported by the base station to the AI device. Optionally, the service information of the cell served by the base station includes at least one of the following:
   - Configuration information of a CSI-RS in the cell. The configuration information of the CSI-RS includes a period of the CSI-RS, occupied resources, transmit power, and the like.
   - A maximum quantity of a connected-state active UEs supported in the cell, and/or a maximum quantity of inactive UEs supported in the cell.
   - A current quantity of a connected-state active UEs in the cell, and/or a current quantity of inactive UEs in the cell.
   - Position of UE in the cell.
   - Quantity distribution of UEs in the cell, for example, distribution density/quantity of UEs in different areas.
   - Spectral efficiency of the cell. Optionally, the spectral efficiency may also be referred to as spectrum effectiveness. In comparison of the effectiveness of different communication systems, a transmission rate may not be enough, and a width of an occupied channel at such a transmission rate should also be considered. Therefore, transmission efficiency of a digital communication system may be measured by a transmission rate of a symbol in a unit frequency band, that is, spectrum effectiveness=R/B (symbol rate/bandwidth), and the unit is Bd/Hz (Baud per hertz). Alternatively, the spectral efficiency may be further defined as: spectrum effectiveness=Rb/B (information rate/bandwidth), and the unit is bps/Hz (bit per second per hertz).
   - Throughput of the cell.
   - Load level of the cell. A correspondence exists between the load level of the cell and the load size of the cell, and the load size of the cell may be represented by the load level of the cell.
   - Usage of uplink/downlink physical resource blocks (physical resource block, PRB) in the cell. Optionally, the usage of PRBs may be a quantity of used uplink or downlink PRBs, a total quantity of PRBs, a ratio of the quantity of used PRBs to the total quantity, or the like.

Usage of uplink/downlink channel control unit (channel control element, CCE) in the cell. The usage of CCEs may be a quantity of used uplink or downlink CCEs, a total quantity of CCEs, a ratio of the quantity of used CCEs to the total quantity, or the like.

Information about a slice supported by the cell. Alternatively, this is described as a slice type supported by the cell. Or Usage of beam resources in the cell, for example, usage of a beam-level uplink/downlink physical resource block.

2. Information about UE in the cell. The information may be collected and reported by the UE to the base station, and reported by the base station to the AI device. The information about the UE in the cell includes at least one of the following:

User experience information of the UE.

Slice/service information of the UE. Or

Capability information of the UE.

It may be understood that the service information of the cell and the information about the UE in the cell may be carried in a same message, or may be carried in different messages, and the base station sends the information to the AI device. If the service information of the cell and the information about the UE in the cell are carried in different messages, the step in which the base station sends the service information of the cell to the AI device may also be performed at any moment after step 801, and step 804 is not limited. If the base station in embodiments of this application includes a CU, a DU, and the like, the base station may further perform the following steps: The CU sends a request to the DU, to request the DU to collect the all or part of service information of the cell. The CU receives the all or part of service information of the cell sent by the DU. For example, the usage of uplink/downlink physical blocks of the cell and the usage of beam resources in the cell in the service information of the cell may be collected by the DU, and other part of service information may be collected by the CU, or may be collected by the CU and the DU together. This is not limited.

Step 805: The AI device determines an energy saving policy based on the AI data related to the dedicated traffic information.

Optionally, the energy saving policy may include at least one of the following: slot shutdown, power amplifier shutdown, carrier shutdown, cell shutdown, cell coverage adjustment, another energy saving policy, and the like.

In some embodiments, the AI device may train the dedicated traffic information in advance to obtain an AI model; or the AI device may obtain configuration information of an AI model by using OAM, and determine the AI model based on the configuration information of the AI model. The AI device may use the AI data related to the dedicated traffic information received from the base station as an input, and input the AI data into the AI model, to obtain an output of the AI model, that is, obtain the foregoing energy saving policy.

The foregoing slot shutdown, power amplifier shutdown, carrier shutdown, or cell shutdown may be understood as a shutdown level or range. Shutdown may be understood as not sending and/or not receiving any data/channel, or only sending and/or receiving limited data/channel (for example, one or more of the following channels: a reference signal, a broadcast channel, a system message, and a paging message). For example, the slot shutdown may refer to disabling a slot. Cell coverage adjustment may be understood as adjusting a coverage area of a cell, for example, reducing a maximum transmit power of a cell, or combining coverage areas of a plurality of cells into one cell. Load migration may be understood as handing over UE from a current cell to another cell, redirecting UE to another cell, or assisting UE in reselection to another cell. It may be understood that, if the AI device determines that a load of a base station increases, the energy saving policy may also include at least one of the following: slot enabling, power amplifier enabling, carrier enabling, cell enabling/activation, and the like.

Step 806: The AI device sends the energy saving policy to the base station.

Optionally, if the energy saving policy is to disable a cell served by the base station, or indicate the base station to perform load migration, the AI device may further send information about a target cell or a target frequency to the base station, so that the base station hands over or redirects the UE to the target cell or the target frequency. Further, the AI device may further send priority information of the target cell or the target frequency to the base station, and the base station may preferentially hand over a terminal device to the target cell or the target frequency with a higher priority.

For example, the energy saving policy may also be that the cell served by the base station changes from "supporting camping" to "not supporting camping". When receiving the energy saving policy, the base station may change the cell managed by the base station from "supporting camping" to "not supporting camping". For example, the base station may change an SSB that corresponds to a cell served by the base station and broadcasts an SIB1 to an SSB that does not broadcast an SIB1, or disable the SSB. "Supporting camping" means that a cell can support camping of a terminal device in a non-connected state, and "not supporting camping" means that a cell cannot support camping of a terminal device in a non-connected state.

In embodiments of this application, the AI device may select an appropriate energy saving policy for the cell based on the AI data related to the collected service information of the cell and/or the collected information about the UE, so that service experience of the UE can be ensured while energy saving is implemented.

It should be noted that, in embodiments of this application, an example in which the AI device is independently deployed is used for description. The AI device may alternatively be integrated into an access network device or a core network device. If the AI device is integrated into a core network device, the AI device in the foregoing embodiment may alternatively be replaced with the core network device. If the AI device is integrated into the access network device, the method in the foregoing embodiment may be replaced with the following: The access network device receives information about the terminal device from the terminal device. The access network device determines an energy saving policy based on the information about the terminal device. For example, the access network device determines an energy saving policy or the like based on the information about the terminal device reported by the terminal device and the service information of the cell collected by the access network device. The energy saving policy includes at least one of the following: slot shutdown, power amplifier shutdown, carrier shutdown, cell shutdown, cell coverage adjustment, load migration, and the like. Optionally, before the access network device receives information about the terminal device from the terminal device, the method may further include: the access network device sends a second request to the terminal device, where the second request is for requesting the terminal device to collect the information about the terminal device. Other processes are similar to those described in FIG. 8. For details, refer to each other. Details are not described again.

It can be learned from the foregoing description that, in Embodiment 1, the AI data that is obtained by the AI device and is for energy saving management is coverage information of the cell and/or common configuration information of the cell, and is usually not related to a service or load. However, in Embodiment 2, the AI data that is obtained by the AI device and is for energy saving management is the service information of the cell and/or the information about the terminal device in the cell, and is usually related to a service or load. The foregoing Embodiment 1 and Embodiment 2 may be separately executed. Alternatively, Embodiment 1 and Embodiment 2 may be combined to jointly determine an energy saving policy. For example, the AI device may simultaneously obtain the coverage information of the cell and the common configuration information of the cell that are not related to a service or load in Embodiment 1 and the service information of the cell and the information about the terminal device in the cell that are related to a service or load in Embodiment 2, and jointly determine an energy saving policy by combining the two. In a possible implementation, the AI device may pre-train the coverage information of the cell and/or the common configuration information of the cell in Embodiment 1 and the service information of the cell and/or the information about the terminal device in the cell in Embodiment 2, to obtain an AI model; or the AI device may obtain configuration information of the AI model by using OAM, and obtain the AI model based on the configuration information. Subsequently, after receiving the coverage information of the cell and/or the common configuration information of the cell in Embodiment 1 and the service information of the cell and/or the information about the terminal device in the cell in Embodiment 2 that are reported by the base station, the AI device may input the two into the AI model. An output of the AI model is a corresponding energy saving policy.

Embodiment 3

This embodiment of this application further provides a communication method. The method is described by using an example in which an AI device is independently deployed. The method includes: An access network device sends AI data to the AI device. The AI device determines, based on the AI data, an update message of common configuration information of a cell served by the access network device. The AI device sends the update message of the common configuration information of the cell served by the access network device to the access network device. Optionally, the access network device may update a common configuration of the cell served by the access network device based on the update message of the common configuration information. The AI data may also be referred to as x3$^{th}$ data or another name, and x3 is a positive integer. For example, the AI data is referred to as third data.

Figure 9:
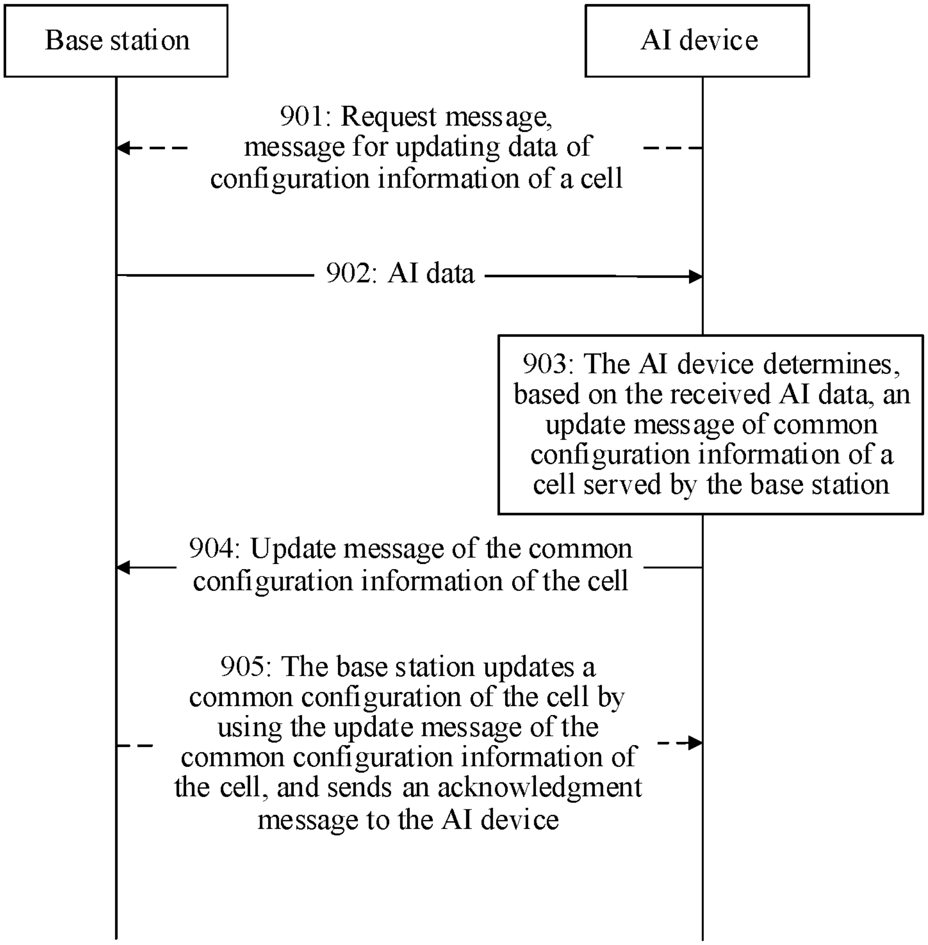
FIG. 9 is still another flowchart of a communication method according to an embodiment of this application.

For ease of understanding, an example in which the access network device is a base station and the terminal device is UE is used for description. As shown in FIG. 9, a procedure of a communication method is provided, including the following steps.

Step 901: An AI device sends a request message to a base station, where the request message is for requesting the base station to collect AI data. The AI data is used by the AI device to update configuration information of a cell served by the base station. Optionally, the request message may include indication information, which indicates which data is to be collected by the base station and/or a manner of reporting the collected data by the base station. For example, in embodiments of this application, the request message may include an indication message indicating the base station to collect the AI data in the following step 902.

It should be noted that step 901 is optional. For example, when receiving the request message, the base station may collect and report the AI data. Alternatively, the base station may automatically collect and report the AI data according to a rule, for example, a rule specified in a protocol.

Step 902: The base station sends the collected AI data to the AI device. Optionally, the AI data may include at least one of the following:

- Configuration information of an SSB of the cell. For example, a period of the SSB, a quantity of beams, and a transmit power of the SSB.
- Configuration information of a random access channel (RACH) of the cell or a carrier in the cell. For example, a time domain position of the RACH, a frequency domain position of the RACH, and a quantity of preambles. The time domain position of the RACH is a time domain resource position for sending a preamble, for example, a frame number and a slot number. The frequency domain position of the RACH refers to a frequency-domain resource position for sending a preamble. A carrier in a cell is that in some scenarios, one cell may have a plurality of uplink carriers, for example, one is referred to as a normal uplink carrier, and another is a supplementary uplink carrier. It should be noted that, in the description of this application, a scenario in which one cell includes a plurality of carriers usually refers to a downlink scenario. However, a scenario in which there are a plurality of carriers in one cell, for example, a cell includes a normal uplink carrier, a supplementary uplink carrier, and the like is usually an uplink scenario.
- Information about a RACH of the cell or a carrier in the cell. For example, a quantity of random access preambles received by the base station in each cell, and/or a quantity of random access preambles received in each SSB.
- Quantity of RRC connections of terminal devices in an active and/or inactive state of the cell.
- Energy consumption statistics information of the base station. For example, energy consumption of sending and/or receiving data by the base station, or a ratio of energy consumption of sending and/or receiving data to total energy consumption.

Optionally, the AI data reported by the base station to the AI device includes at least information corresponding to a cell served by a current base station or a carrier in the cell, and may further include information corresponding to a cell served by a neighboring base station. For example, the base station interacts with the neighboring base station to obtain information corresponding to the cell served by the neighboring base station. In some embodiments, the AI data reported by the base station to the AI device may further carry time information, and the time information may be a time at which the base station reports the AI data. In some other embodiments, the AI data may further carry an identifier of the base station, an identifier of the cell, and/or the like.

Step 903: The AI device determines, based on the AI data, an update message of common configuration information of the cell served by the base station, where the update message of the common configuration information of the cell served by the base station includes at least one of the following:

Configuration update information of an SSB of the cell.

Configuration update information of a RACH of the cell or a carrier in the cell.

Optionally, the AI device may determine the update message of the common configuration information by using AI data reported by the base station once or a plurality of times; or the AI device may determine the update message of the common configuration information by using historical information, for example, AI data collected by the AI device in previous time periods. This is not limited. In some embodiments, the AI device may train the common configuration information in advance to obtain an AI model. Certainly, the AI device may obtain the configuration information of an AI model from OAM, and obtain the AI model based on the configuration information. When receiving the AI data reported by the base station, the AI device may use the AI data as an input and input the AI data to the AI model. An output of the AI model is the update message of the common configuration information. The AI device may use the AI data received once or a plurality of times as an input of the AI model. For example, the AI device may use AI data collected in a historical period of time as an input of the AI model. This is not limited.

Step 904: The AI device sends the update message of common configuration information of the cell to the base station.

Step 905: The base station updates a common configuration of the cell by using the update message of the common configuration information of the cell. Optionally, the base station sends an acknowledgment message to the AI device. For example, in some embodiments, the base station may send a response message to the AI device. The response message is for notifying the AI device that the base station has updated the common configuration of the cell based on the update message (that is, the base station uses the common configuration information of the cell sent by the AI device). In some embodiments, the base station may not use the AI device to send the common configuration information of the cell, and the base station sends an acknowledgment message to the AI device. The acknowledgment message carries indication information, indicating that the base station does not use the common configuration information of the cell sent by the AI device. In some embodiments, the base station updates the common configuration information of the cell by using the common configuration information of the cell sent by the AI device as a reference. However, the updated common configuration information of the cell is different from the common configuration information of the cell sent by the AI device. In this case, the base station sends an acknowledgment message to the AI device. The acknowledgment message carries indication information, indicating the updated common configuration information of the cell served by the base station to the base station. The foregoing step 905 is optional, and may not be performed.

In some embodiments, when step 901 does not exist (for example, the base station does not need to report the AI data after each request of the AI device is received, but the base station reports the AI data according to a rule specified in a protocol, for example, periodically reporting), the AI device can learn, based on the acknowledgment message, that data subsequently received from the base station is data obtained after the updated common configuration information is used.

In embodiments of this application, the AI device updates the common configuration information of the cell based on the AI data that is reported by the base station and related to the common configuration of the cell, so that the common configuration of each cell is more optimized, and energy consumption on the side of the base station can be reduced.

It needs to be noted that in the foregoing description is provided by using an example in which the AI device is independently deployed. In practice, the AI device may be alternatively integrated into an access network device or a core network device. If the AI device is integrated into a core network device, the AI device in the foregoing description may be replaced with the core network device. If the AI device is integrated into the access network device, the foregoing method may be as follows: The access network device collects AI data. The access network device determines the update message of the common configuration information based on the AI data.

The solution described in the foregoing Embodiment 3 may be independently implemented, or may be combined with the foregoing Embodiment 1. For example, the common configuration information of the cell served by the access network device is updated by using the method described in Embodiment 3. The access network device may report the updated common configuration information of the cell to the AI device. The access network device determines an energy saving policy based on the updated common configuration information of the cell.

In Embodiment 1 to Embodiment 3, when the access network device includes a CU and a DU, the access network device may be replaced with the CU or the DU. This is similar to the method described in the foregoing procedure, and details are not described again. When the CU includes a CU-CP and a CU-UP, the access network device may be replaced with the CU-CP or the CU-UP. This is similar to the method described in the foregoing procedure, and details are not described again.

With reference to the descriptions of Embodiment 1 and Embodiment 3, the descriptions of the foregoing service scenario are intended to describe the technical solutions in embodiments of this application more clearly, and do not constitute a limitation on the technical solutions provided in embodiments of this application. For example, in a possible implementation, the access network device may alternatively be replaced with a first device, the AI device may alternatively be replaced with a second device, the terminal device may alternatively be replaced with a third device, the core network device may alternatively be replaced with a fourth device, and the like. The first device, the second device, the third device, and the fourth device may be any four different devices in any service scenario. For example, in some embodiments, the solution in Embodiment 1 may be described as follows. The first device sends AI data to the second device. The second device determines an energy saving policy based on the AI data. The second device sends the energy saving policy to the first device. The energy saving policy indicates at least one of the following: an energy saving area (ESA) to which a cell served by the first device belongs; and an energy saving priority of each cell in the ESA. The solution in Embodiment 2 may be described as follows. The first device sends AI data to the second device. The second device determines an energy saving policy based on the AI data. The second device sends the energy saving policy to the first device. The energy saving policy includes at least one of the following: slot shutdown, power amplifier shutdown, carrier shutdown, cell shutdown, cell coverage adjustment, load migration, and the like. The solution described in Embodiment 3 may be described as follows. The first device sends AI data to the second device. The second device determines, based on the AI data, an update message of a common configuration information of a cell served by the first device. The first device sends, to the second device, the update message of the common configuration information of the cell served by the first device.

The methods provided in embodiments of this application are described above in detail with reference to FIG. 1 to FIG. 9. The following describes in detail apparatuses provided in embodiments of this application with reference to FIG. 10 and FIG. 11. It should be understood that the description of the apparatus embodiment corresponds to the description of the method embodiment. For content not described in detail, refer to the description in the foregoing method embodiment. To implement the functions in the method provided in embodiments of this application, the AI device, the network device, and the terminal device each may include a hardware structure and/or a software module, to implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 10:
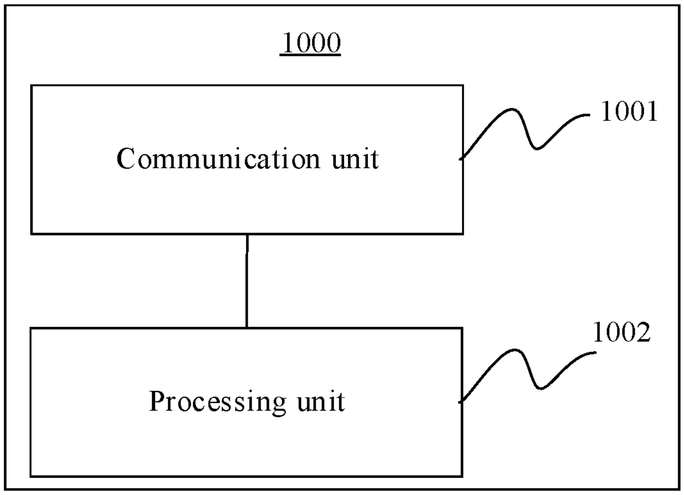
FIG. 10 is a schematic diagram of a structure of an apparatus according to an embodiment of this application.

FIG. 10 is a schematic block diagram of an apparatus 1000 according to an embodiment of this application. The apparatus is configured to implement functions of the terminal device, the network device, or the AI device in the foregoing method embodiments. The apparatus may be a software unit, a hardware circuit, a software unit+a hardware circuit, a chip system, or the like. This is not limited. The chip system may include a chip, or may include a chip and another discrete component. The apparatus includes a communication unit 1001, configured to communicate with the outside. The apparatus may further include a processing unit 1002, configured to perform processing.

In an example, the apparatus 1000 is configured to implement an operation of the network device in the foregoing method 1. The apparatus 1000 may be a network device, or may be a software module, a chip, and/or a circuit configured in the network device, or the like. The communication unit 1001 is configured to perform a sending/receiving-related operation of the network device in the foregoing method Embodiment 1, and the processing unit 1002 is configured to perform a processing-related operation of the network device in the foregoing method Embodiment 1.

For example, the communication unit 1001 is configured to send AI data to an artificial intelligence (AI) device. The communication unit 1001 is further configured to receive an energy saving policy from the AI device, where the energy saving policy indicates at least one of the following: an energy saving area (ESA) to which a cell served by the network device belongs; and an energy saving priority of each cell in the ESA. Optionally, the processing unit 1002 may perform the energy saving operation according to the energy saving policy.

Optionally, the AI data includes at least one of the following: coverage information of the cell, and common configuration information of the cell.

Optionally, the coverage information of the cell includes at least one of the following: position information of a terminal device in the cell, beam information measured by the terminal device, cell quality information measured by the terminal device, time information, and cell identity information.

Optionally, the common configuration information of the cell includes at least one of the following: first common configuration information and second common configuration information.

Optionally, the first common configuration information includes at least one of the following: a period of a synchronization signal/physical broadcast channel block (SSB); a period of a master information block (MIB); a period of a system message block 1 (SIB1) or a period of a system message that needs to be broadcast and sent; paging configuration information; configuration information of a random access resource; a quantity of SSB beams of the cell; a quantity of antennas; and a maximum transmit power of the cell.

Optionally, the second common configuration information includes at least one of the following: a subcarrier spacing supported by the cell and a slice type supported by the cell.

Optionally, the communication unit 1001 is further configured to send a first request to the terminal device, where the first request is for requesting the terminal device to collect the coverage information of the cell. The communication unit 1001 is further configured to receive a first response from the terminal device, where the first response includes the coverage information of the cell collected by the terminal device.

In another example, the apparatus 1000 is configured to implement an operation of the AI device in the foregoing method embodiment. The apparatus 1000 may be an AI device, or may be a software module, a chip, and/or a circuit configured in the AI device. The communication unit 1001 is configured to perform a sending/receiving-related operation of the AI device in the foregoing method Embodiment 1, and the processing unit 1002 is configured to perform a processing-related operation of the AI device in the foregoing method Embodiment 1.

For example, the communication unit 1001 is configured to receive artificial intelligence (AI) data from a network device. The processing unit 1002 is configured to determine an energy saving policy based on the AI data. The communication unit 1001 is further configured to send the energy saving policy to the network device, where the energy saving policy indicates at least one of the following: an energy saving area (ESA) to which a cell served by the network device belongs; and an energy saving priority of each cell in the ESA.

Optionally, the AI data includes at least one of the following: coverage information of the cell, and common configuration information of the cell.

Optionally, the coverage information of the cell includes at least one of the following: position information of a terminal device in the cell, beam information measured by the terminal device, cell quality information measured by the terminal device, time information, and cell identity information.

Optionally, the common configuration information of the cell includes at least one of the following: first common configuration information and second common configuration information.

Optionally, the first common configuration information includes at least one of the following: a period of a synchronization signal/physical broadcast channel block (SSB); a period of a master information block (MIB); a period of a system message block 1 (SIB1) or a system message that needs to be broadcast and sent; paging configuration information; configuration information of a random access resource; a quantity of SSB beams of the cell; a quantity of antennas; and a maximum transmit power of the cell.

Optionally, the second common configuration information includes at least one of the following: a subcarrier spacing supported by the cell and a slice type supported by the cell.

In an example, the apparatus 1000 is configured to implement an operation of the network device in the foregoing method Embodiment 2. The apparatus 1000 may be a network device, or may be a software module, a chip, and/or a circuit configured in the network device, or the like. The communication unit 1001 is configured to perform a sending/receiving-related operation of the network device in the foregoing method Embodiment 2, and the processing unit 1002 is configured to perform a processing-related operation of the network device in the foregoing method Embodiment 2.

For example, the communication unit 1001 is configured to send AI data to an artificial intelligence (AI) device. The communication unit 1001 is further configured to receive an energy saving policy from the AI device, where the energy saving policy includes at least one of the following: slot shutdown, power amplifier shutdown, carrier shutdown, cell shutdown, cell coverage adjustment, and load migration. Optionally, the processing unit 1002 is configured to perform the energy saving operation according to the energy saving policy.

Optionally, the AI data includes at least one of the following: service information of a cell served by a network device; and information about a terminal device in the cell.

Optionally, the service information of the cell served by the network device includes at least one of the following: configuration information of a channel state information-reference signal (CSI-RS) in the cell; a maximum quantity of terminal devices in a connected state supported in the cell; a current quantity of terminal devices in a connected state in the cell; a position of a terminal device in the cell; quantity distribution of terminal devices in the cell; spectral efficiency of the cell; a throughput of the cell; a load level of the cell; usage of an uplink physical resource block or a downlink physical resource block in the cell; information about a slice supported by the cell; and usage of a beam resource in the cell.

Optionally, the information about the terminal device in the cell includes at least one of the following: user experience information of the terminal device; slice or service information of the terminal device; and capability information of the terminal device.

Optionally, the communication unit 1001 is further configured to send a second request to a terminal device, where the second request is for requesting the terminal device to collect information about the terminal device. The communication unit 1001 is further configured to receive a second response from the terminal device, where the second response includes the information about the terminal device collected by the terminal device.

In another example, the apparatus 1000 is configured to implement an operation of the AI device in the foregoing method Embodiment 2. The apparatus 1000 may be an AI device, or may be a software module, a chip, and/or a circuit configured in the AI device. The communication unit 1001 is configured to perform a sending/receiving-related operation of the AI device in the foregoing method Embodiment 2. The processing unit 1002 is configured to perform a processing-related operation of the AI device in the foregoing method Embodiment 2.

For example, the communication unit 1001 is configured to receive artificial intelligence (AI) data from a network device. The processing unit 1002 is configured to determine an energy saving policy based on the AI data. The communication unit 1001 is further configured to send the energy saving policy to the network device, where the energy saving policy includes at least one of the following: slot shutdown, power amplifier shutdown, carrier shutdown, cell shutdown, cell coverage adjustment, and load migration.

Optionally, the AI data includes at least one of the following: service information of a cell served by the network device; and information about a terminal device in the cell.

Optionally, the service information of the cell served by the network device includes at least one of the following: configuration information of a channel state information-reference signal CSI-RS in the cell; a maximum quantity of terminal devices in a connected state supported in the cell; a current quantity of terminal devices in a connected state in the cell; a position of a terminal device in the cell; quantity distribution of terminal devices in the cell; spectral efficiency of the cell; a throughput of the cell; a load level of the cell; usage of an uplink physical resource block or a downlink physical resource block in the cell; information about a slice supported by the cell; and usage of a beam resource in the cell.

Optionally, the information about the terminal device in the cell includes at least one of the following: user experience information of the terminal device; slice or service information of the terminal device; and capability information of the terminal device.

In an example, the apparatus 1000 is configured to implement an operation of the network device in the foregoing method Embodiment 3. The apparatus 1000 may be a network device, or may be a software module, a chip, and/or a circuit configured in the network device, or the like. The communication unit 1001 is configured to perform a sending/receiving-related operation of the network device in the foregoing method Embodiment 3, and the processing unit 1002 is configured to perform a processing-related operation of the network device in the foregoing method Embodiment 3.

For example, the communication unit 1001 is configured to send AI data to an artificial intelligence (AI) device. The communication unit 1001 is further configured to receive, from the network device of the AI device, an update message of common configuration information of a cell served by the network device.

Optionally, a packet of the AI data includes at least one of the following: synchronization signal/physical broadcast channel block (SSB) configuration information of the cell; random access channel (RACH) configuration information of the cell or a carrier in the cell; RACH measurement information of the cell or a carrier in the cell; a quantity of radio resource control (RRC) connections of the cell; and energy consumption statistical information of the network device.

Optionally, the update message includes at least one of the following: configuration update information of an SSB of the cell; and configuration update information of a RACH of the cell or a carrier in the cell.

Optionally, the communication unit 1001 is further configured to receive a third request from the AI device, where the third request is for requesting the network device to report the AI data.

Optionally, the processing unit 1002 is configured to update, based on the update message, a common configuration of the cell served by the network device. The communication unit 1001 is further configured to send a third response to the AI device, where the third response is for notifying the cell of an updated common configuration.

In another example, the apparatus 1000 is configured to implement an operation of the AI device in the foregoing method Embodiment 3. The apparatus 1000 may be an AI device, or may be a software module, a chip, and/or a circuit configured in the AI device. The communication unit 1001 is configured to perform a sending/receiving-related operation of the AI device in the foregoing method Embodiment 3. The processing unit 1002 is configured to perform a processing-related operation of the AI device in the foregoing method Embodiment 3.

For example, the communication unit 1001 is configured to receive artificial intelligence (AI) data from a network device. The processing unit 1002 is configured to determine, based on the AI data, an update message of common configuration information of a cell served by the network device. The communication unit 1001 is further configured to send the update message of the common configuration information to the network device.

Optionally, the AI data includes at least one of the following: synchronization signal/physical broadcast channel block (SSB) configuration information of the cell; random access channel (RACH) configuration information of the cell or a carrier in the cell; RACH measurement information of the cell or a carrier in the cell; a quantity of radio resource control (RRC) connections of the cell; and energy consumption statistical information of the network device.

Optionally, the update message includes at least one of the following: configuration update information of an SSB of the cell; and configuration update information of a RACH of the cell or a carrier in the cell.

Optionally, the communication unit 1001 is further configured to send a third request to the network device, where the third request is for requesting the network device to report the AI data.

Optionally, the communication unit 1001 is further configured to receive a third response from the network device, where the third response is for notifying the cell of the updated common configuration.

In an example, the apparatus 1000 is configured to implement an operation of the network device when the AI device is integrated into the network device in the foregoing method Embodiment 1. The apparatus 1000 may be a network device, or may be a software module, a chip, and/or a circuit configured in the network device, or the like. The communication unit 1001 is configured to perform a sending/receiving-related operation of the network device in the foregoing method Embodiment 1, and the processing unit 1002 is configured to perform a processing-related operation of the network device in the foregoing method Embodiment 1.

For example, the communication unit 1001 is configured to receive coverage information of a cell served by a network device from a terminal device. The processing unit 1002 is configured to determine an energy saving policy based on the coverage information of the cell and/or common configuration information of the cell, where the energy saving policy indicates at least one of the following:

an energy saving area (ESA) to which the cell served by the network device belongs; and an energy saving priority of each cell in the ESA.

Optionally, the coverage information of the cell includes at least one of the following: position information of a terminal device in the cell, beam information of the cell measured by the terminal device, cell quality information measured by the terminal device, time information, and cell identity information.

Optionally, the common configuration information of the cell includes at least one of the following: first common configuration information and second common configuration information.

Optionally, the first common configuration information includes at least one of the following: a period of a synchronization signal/physical broadcast channel block (SSB); a period of a master information block (MIB); a period of a system message block 1 (SIB1) or a period of a system message that needs to be broadcast and sent; paging configuration information; configuration information of a random access resource; a quantity of SSB beams of the cell; a quantity of antennas; and a maximum transmit power of the cell.

Optionally, the second common configuration information includes at least one of the following: a subcarrier spacing supported by the cell and a slice type supported by the cell.

Optionally, the receiving coverage information of a cell served by a network device from a terminal device further includes: sending a first request to the terminal device, where the first request is for requesting the terminal device to collect the coverage information of the cell; and receiving a first response from the terminal device, where the first response includes the coverage information of the cell collected by the terminal device.

In an example, the apparatus 1000 is configured to implement an operation of the terminal device in the foregoing method Embodiment 1. The apparatus 1000 may be a terminal device, or may be a software module, a chip, and/or a circuit, or the like configured in the terminal device. The communication unit 1001 is configured to perform a sending/receiving-related operation of the terminal device in the foregoing method Embodiment 1, and the processing unit 1002 is configured to perform a processing-related operation of the terminal device in the foregoing method Embodiment 1.

For example, the communication unit 1001 is configured to send coverage information of a cell served by the network device to the network device.

In the method, the network device or the AI device may use the coverage information of the cell for determining an energy saving policy, and the energy saving policy indicates at least one of the following:

an energy saving area (ESA) to which the cell served by the network device belongs; and an energy saving priority of each cell in the ESA.

Optionally, the processing unit 1002 is configured to collect the coverage information of the cell served by the network device.

Optionally, the coverage information of the cell includes at least one of the following: position information of a terminal device in the cell, beam information of the cell measured by the terminal device, cell quality information measured by the terminal device, time information, and cell identity information.

Optionally, the sending coverage information of a cell served by the network device to the network device includes: receiving a first request from the network device, where the first request is for requesting the terminal device to collect the coverage information of the cell; and sending a first response to the network device, where the first response includes the coverage information of the cell collected by the terminal device.

In an example, the apparatus 1000 is configured to implement an operation of the network device when the AI device is integrated into the network device in the foregoing method Embodiment 2. The apparatus 1000 may be a network device, or may be a software module, a chip, and/or a circuit configured in the network device, or the like. The communication unit 1001 is configured to perform a sending/receiving-related operation of the network device in the foregoing method Embodiment 2, and the processing unit 1002 is configured to perform a processing-related operation of the network device in the foregoing method Embodiment 2.

For example, the communication unit 1001 is configured to receive information about a terminal device in a cell served by a network device from the terminal device. The processing unit 1002 is configured to determine an energy saving policy based on the information about the terminal device in the cell and/or service information of the cell, where the energy saving policy includes at least one of the following: slot shutdown, power amplifier shutdown, carrier shutdown, cell shutdown, cell coverage adjustment, and load migration.

Optionally, the information about the terminal device in the cell includes at least one of the following: user experience information of the terminal device; slice or service information of the terminal device; and capability information of the terminal device.

Optionally, the service information of the cell includes at least one of the following: configuration information of a channel state information-reference signal (CSI-RS) in the cell; a maximum quantity of terminal devices in a connected state supported in the cell; a current quantity of terminal devices in a connected state in the cell; a position of a terminal device in the cell; quantity distribution of terminal devices in the cell; spectral efficiency of the cell; a throughput of the cell; a load level of the cell; usage of an uplink physical resource block or a downlink physical resource block in the cell; information about a slice supported by the cell; and usage of a beam resource in the cell.

Optionally, the receiving information about a terminal device in a cell served by a network device from the terminal device includes: sending a second request to the terminal device, where the second request is for requesting the terminal device to collect information about the terminal device; and receiving a second response from the terminal device, where the second response includes the information about the terminal device collected by the terminal device.

In an example, the apparatus 1000 is configured to implement an operation of the terminal device in the foregoing method Embodiment 2. The apparatus 1000 may be a terminal device, or may be a software module, a chip, and/or a circuit, or the like configured in the terminal device. The communication unit 1001 is configured to perform a sending/receiving-related operation of the terminal device in the foregoing method Embodiment 2, and the processing unit 1002 is configured to perform a processing-related operation of the terminal device in the foregoing method Embodiment 2.

For example, the communication unit 1001 is configured to send information about a terminal device to a network device.

In the method, the information about the terminal device may be used by the network device or the AI device to determine an energy saving policy. The energy saving policy includes at least one of the following: slot shutdown, power amplifier shutdown, carrier shutdown, cell shutdown, cell coverage adjustment, and load migration. Optionally, the processing unit 1002 is configured to collect the information about the terminal device in the cell served by the network device.

Optionally, the information about the terminal device includes at least one of the following: user experience information of the terminal device; slice or service information of the terminal device; and capability information of the terminal device.

Optionally, the sending information about the terminal device in the cell served by the network device to the network device includes: receiving a second request from the network device, where the second request is for requesting the terminal device to collect the information about the terminal device; and sending a second response to the network device, where the second response includes the information about the terminal device collected by the terminal device.

In embodiments of this application, division into the units is an example, is merely division into logical functions, and may be other division during actual implementation. In addition, functional units in embodiments of this application may be integrated into one processor, or each of the units may exist alone physically, or two or more units may be integrated into one unit. The integrated unit may be implemented in a form of hardware, or may be implemented in a form of a software functional unit.

It may be understood that, in the foregoing embodiments, a function of the communication unit may be implemented by a communication interface, and a function of the processing unit may be implemented by at least one processor. In embodiments of this application, the communication interface may be a transceiver, a circuit, a bus, a module, a pin, or a communication interface of another type. In embodiments of this application, when the communication interface is the transceiver, the transceiver may include an independent receiver and an independent transmitter, or may be a transceiver integrated with a transceiver function, or may be an interface circuit. For example, the transceiver may include a transmitter, a receiver, and/or the like, which are respectively configured to implement functions of the sending unit and/or the receiving unit. Descriptions are provided below by way of example with reference to FIG. 11.

Figure 11:
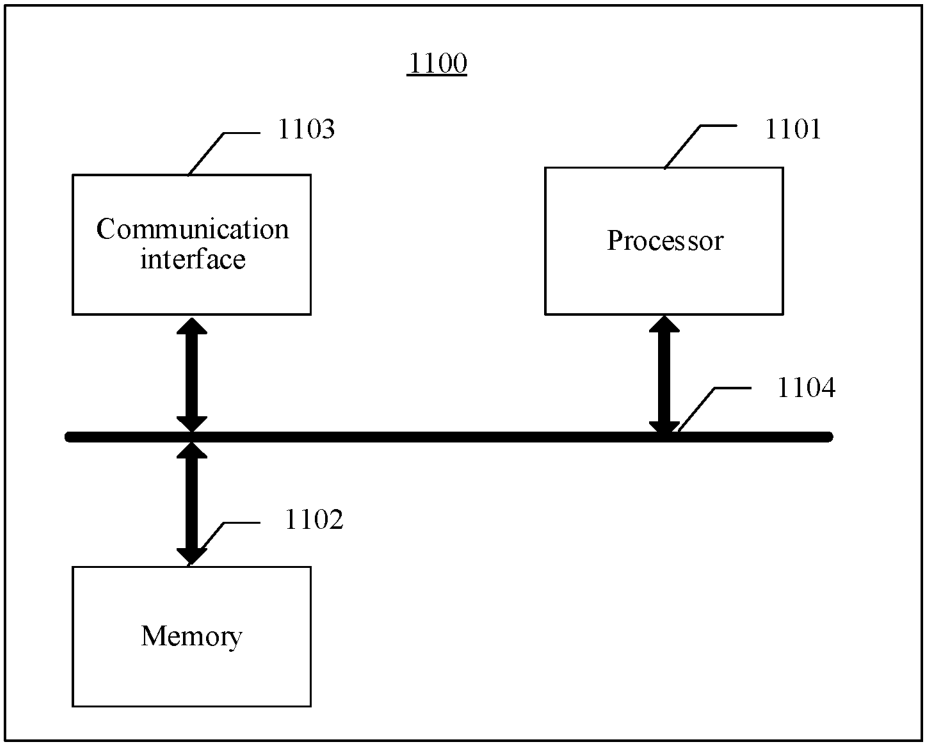
FIG. 11 is another schematic diagram of a structure of an apparatus according to an embodiment of this application.

A communication apparatus 1100 shown in FIG. 11 includes at least one processor 1101. The communication apparatus 1100 may further include at least one memory 1102, configured to store program instructions and/or data. The memory 1102 is coupled to the processor 1101. The coupling in this embodiment of this application may be indirect coupling or a communication connection between apparatuses, units, or modules in an electrical form, a mechanical form, or another form, and is used for information exchange between the apparatuses, the units, or the modules. The processor 1101 may cooperate with the memory 1102, the processor 1101 may execute program instructions stored in the memory 1102, and at least one of the at least one memory 1102 may be included in the processor 1101.

The apparatus 1100 may further include a communication interface 1103, configured to communicate with another device through a transmission medium, so that the communication apparatus 1100 can communicate with the other device.

It should be understood that connection media between the processor 1101, the memory 1102, and the communication interface 1103 are not limited in embodiments of this application. In embodiments of this application, in FIG. 11, the memory 1102, the processor 1101, and the communication interface 1103 are connected to each other by a communication bus 1104. The bus is represented by a thick line in FIG. 11, and connection manners of other components are merely for schematic descriptions and are not construed as a limitation. The bus may include an address bus, a data bus, a control bus, and the like. For ease of representation, only one thick line is used to represent the bus in FIG. 11, but this does not mean that there is only one bus or only one type of bus.

In an example, the apparatus 1100 is configured to implement an operation of the network device in Embodiment 3 of the foregoing method. The apparatus 1100 may be a network device, or may be a chip, a circuit, or the like configured in the network device. The communication interface 1103 is configured to perform a sending/receiving-related operation of the network device in the foregoing method Embodiment 1, and the processor 1101 is configured to perform a processing-related operation of the network device in the foregoing method Embodiment 1.

For example, the communication interface 1103 is configured to send AI data to an artificial intelligence (AI) device. The communication interface 1103 is further configured to receive an energy saving policy from the AI device, where the energy saving policy indicates at least one of the following: an energy saving area (ESA) to which a cell served by the network device belongs; and an energy saving priority of each cell in the ESA. Optionally, the processor 1101 may perform the energy saving operation according to the energy saving policy. Other specific details are similar to corresponding descriptions in FIG. 10, and details are not described herein again.

In another example, the apparatus 1100 is configured to implement an operation of the AI device in the foregoing method Embodiment 1. The apparatus 1100 may be an AI device, or may be a chip or circuit configured in the AI device. The communication interface 1103 is configured to perform a sending/receiving-related operation of the AI device in the foregoing method Embodiment 1, and the processor 1101 is configured to perform a processing-related operation of the AI device in the foregoing method Embodiment 1.

For example, the communication interface 1103 is configured to receive artificial intelligence (AI) data from a network device. The processor 1101 is configured to determine an energy saving policy based on the AI data. The communication interface 1103 is further configured to send the energy saving policy to the network device, where the energy saving policy indicates at least one of the following: an energy saving area (ESA) to which a cell served by the network device belongs; and an energy saving priority of each cell in the ESA. Other specific details are similar to corresponding descriptions in FIG. 10, and details are not described herein again.

In an example, the apparatus 1100 is configured to implement an operation of the network device in the foregoing method Embodiment 2. The apparatus 1100 may be a network device, or may be a chip, a circuit, or the like configured in the network device. The communication interface 1103 is configured to perform a sending/receiving-related operation of the network device in the foregoing method Embodiment 2, and the processor 1101 is configured to perform a processing-related operation of the network device in the foregoing method Embodiment 2. Other specific details are similar to corresponding descriptions in FIG. 10, and details are not described herein again.

For example, the communication interface 1103 is configured to send AI data to an artificial intelligence (AI) device. The communication interface 1103 is further configured to receive an energy saving policy from the AI device, where the energy saving policy includes at least one of the following: slot shutdown, power amplifier shutdown, carrier shutdown, cell shutdown, cell coverage adjustment, and load migration. Optionally, the processor 1101 is configured to perform the energy saving operation according to the energy saving policy. Other specific details are similar to corresponding descriptions in FIG. 10, and details are not described herein again.

In another example, the apparatus 1100 is configured to implement an operation of the AI device in the foregoing method Embodiment 2. The apparatus 1100 may be an AI device, or may be a chip or circuit configured in the AI device. The communication interface 1103 is configured to perform a sending/receiving-related operation of the AI device in the foregoing method Embodiment 2, and the processor 1101 is configured to perform a processing-related operation of the AI device in the foregoing method Embodiment 2.

For example, the communication interface 1103 is configured to receive artificial intelligence (AI) data from a network device. The processor 1101 is configured to determine an energy saving policy based on the AI data. The communication interface 1103 is further configured to send the energy saving policy to the network device, where the energy saving policy includes at least one of the following: slot shutdown, power amplifier shutdown, carrier shutdown, cell shutdown, cell coverage adjustment, and load migration. Other specific details are similar to corresponding descriptions in FIG. 10, and details are not described herein again.

In an example, the apparatus 1100 is configured to implement an operation of the network device in the foregoing method Embodiment 3. The apparatus 1100 may be a network device, or may be a chip, a circuit, or the like configured in the network device. The communication interface 1103 is configured to perform a sending/receiving-related operation of the network device in the foregoing method Embodiment 3, and the processor 1101 is configured to perform a processing-related operation of the network device in the foregoing method Embodiment 3.

For example, the communication interface 1103 is configured to send AI data to an artificial intelligence (AI) device. The communication interface 1103 is further configured to receive, from the network device of the AI device, an update message of common configuration information of a cell served by the network device. Other specific details are similar to corresponding descriptions in FIG. 10, and details are not described herein again.

In an example, the apparatus 1100 is configured to implement an operation of the AI device in the foregoing method Embodiment 3. The apparatus 1100 may be an AI device, or may be a chip or circuit configured in the AI device. The communication interface 1103 is configured to perform a sending/receiving-related operation of the AI device in the foregoing method Embodiment 3, and the processor 1101 is configured to perform a processing-related operation of the AI device in the foregoing method Embodiment 3.

For example, the communication interface 1103 is configured to receive artificial intelligence (AI) data from a network device. The processor 1101 is configured to determine, based on the AI data, an update message of common configuration information of a cell served by the network device. The communication interface 1103 is further configured to send the update message of the common configuration information to the network device. Other specific details are similar to corresponding descriptions in FIG. 10, and details are not described herein again.

In an example, the apparatus 1100 is configured to implement an operation of the network device when the AI device is integrated into the network device in the foregoing method Embodiment 1. The apparatus 1100 may be a network device, or may be a chip, a circuit, or the like configured in the network device. The communication interface 1103 is configured to perform a sending/receiving-related operation of the network device in the foregoing method Embodiment 1, and the processor 1101 is configured to perform a processing-related operation of the network device in the foregoing method Embodiment 1.

For example, the communication interface 1103 is configured to receive coverage information of a cell served by a network device from a terminal device. The processing unit 1002 is configured to determine an energy saving policy based on the coverage information of the cell and/or common configuration information of the cell, where the energy saving policy indicates at least one of the following: an energy saving area (ESA) to which the cell served by the access network device belongs; and an energy saving priority of each cell in the ESA. Other specific details are similar to corresponding descriptions in FIG. 10, and details are not described herein again.

In an example, the apparatus 1100 is configured to implement an operation of the terminal device in the foregoing method Embodiment 1. The apparatus 1100 may be a terminal device, or may be a chip, a circuit, or the like configured in the terminal device. The communication interface 1103 is configured to perform a sending/receiving-related operation of the terminal device in the foregoing method Embodiment 1, and the processor 1101 is configured to perform a processing-related operation of the terminal device in the foregoing method Embodiment 1.

For example, the communication interface 1103 is configured to send coverage information of a cell served by the network device to the network device.

In the method, the network device or the AI device may use the coverage information of the cell to determine an energy saving policy, where the energy saving policy indicates at least one of the following: an energy saving area (ESA) to which the cell served by the network device belongs; and an energy saving priority of each cell in the ESA. Other specific details are similar to corresponding descriptions in FIG. 10, and details are not described herein again.

In an example, the apparatus 1100 is configured to implement an operation of the network device when the AI device is integrated into the network device in the foregoing method Embodiment 2. The apparatus 1100 may be a network device, or may be a chip, a circuit, or the like configured in the network device. The communication interface 1103 is configured to perform a sending/receiving-related operation of the network device in the foregoing method Embodiment 2, and the processor 1101 is configured to perform a processing-related operation of the network device in the foregoing method Embodiment 2.

For example, the communication interface 1103 is configured to receive information about a terminal device in a cell served by a network device from the terminal device. The processor 1101 is configured to determine an energy saving policy based on the information about the terminal device in the cell and/or service information of the cell, where the energy saving policy includes at least one of the following: slot shutdown, power amplifier shutdown, carrier shutdown, cell shutdown, cell coverage adjustment, and load migration. Other specific details are similar to corresponding descriptions in FIG. 10, and details are not described herein again.

In an example, the apparatus 1100 is configured to implement an operation of the terminal device in the foregoing method Embodiment 2. The apparatus 1100 may be a terminal device, or may be a chip, a circuit, or the like configured in the terminal device. The communication interface 1103 is configured to perform a sending/receiving-related operation of the terminal device in the foregoing method Embodiment 2, and the processor 1101 is configured to perform a processing-related operation of the terminal device in the foregoing method Embodiment 2.

For example, the communication interface 1103 is configured to send information about a terminal device to a network device.

In the method, the information about the terminal device may be used by the network device or the AI device to determine an energy saving policy. The energy saving policy includes at least one of the following: slot shutdown, power amplifier shutdown, carrier shutdown, cell shutdown, cell coverage adjustment, and load migration. Optionally, the processor 1101 is configured to collect the information about the terminal device in the cell served by the network device. Other specific details are similar to corresponding descriptions in FIG. 10, and details are not described herein again.

Further, an embodiment of this application further provides an apparatus. The apparatus is configured to perform the method on a side of a terminal device, the method on a side of a network device, or the method on a side of an AI device in the foregoing method embodiments. A computer-readable storage medium, including a program. When the program is run by a processor, the method on a side of a terminal device in the foregoing method embodiments is performed, or the method on a side of a network device is performed, or the method on a side of an AI device is performed. A computer program product is provided. The computer program product includes computer program code. When the computer program code runs on a computer, the computer is enabled to implement the method on a side of a terminal device, the method on a side of a network device, or the method on a side of an AI device in the foregoing method embodiments. A chip includes a processor, where the processor is coupled to a memory, the memory is configured to store a program or instructions, and when the program or the instructions are executed by the processor, an apparatus is enabled to perform the method on a side of a terminal device, the method on a side of a network device, or the method on a side of an AI device in the foregoing method embodiments. A system includes the terminal device, the network device, and the AI device in the foregoing method embodiments.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general purpose processor may be a microprocessor or any conventional processor or the like. The steps of the method disclosed with reference to embodiments of this application may be directly performed by a hardware processor, or may be performed by using a combination of hardware in the processor and a software module.

In embodiments of this application, the memory may be a non-volatile memory, such as a hard disk drive (HDD) or a solid-state drive (SSD), or may be a volatile memory, such as a random access memory (RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

All or some of the methods in embodiments of this application may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of the present disclosure are all or partially generated. The computer may be a general-purpose computer, a dedicated computer, a computer network, an access network device, a terminal device, a core network device, an AI device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication apparatus, comprising a processor, coupled with a memory, wherein the processor is configured to execute instructions stored in the memory to cause the apparatus to:

send data to an artificial intelligence (AI) device, wherein the data comprises coverage information of a cell and common configuration information of the cell; and receive an energy saving policy from the AI device, wherein the energy saving policy is determined by the AI device at least based on the coverage information of the cell and the common configuration information of the cell and the energy saving policy comprises at least one of the following:

an identifier of an energy saving area (ESA) to which a cell served by a network device belongs, wherein an area of the ESA is larger than an area of the cell served by the network device; or an energy saving priority of each cell in the ESA; and wherein in a handover process, the cell served by the network device is preferentially handed over to a neighboring cell belonging to a same ESA identifier as the ESA identifier to which the cell served by the network device belongs.

2. The apparatus according to claim 1, wherein the coverage information of the cell comprises at least one of the following:

position information of a terminal device in the cell, beam information measured by the terminal device, cell quality information measured by the terminal device, time information, or cell identity information.

3. The apparatus according to claim 1, wherein the common configuration information of the cell comprises first common configuration information, and the first common configuration information comprises at least one of the following:

a period of a synchronization signal/physical broadcast channel block (SSB);

a period of a master information block (MIB);

a period of a system message block 1 (SIB1) or a period of a system message that needs to be broadcast and sent;

paging configuration information;

configuration information of a random access resource;

a quantity of SSB beams of the cell;

a quantity of antennas; or a maximum transmit power of the cell.

4. The apparatus according to claim 1, wherein the common configuration information of the cell comprises second common configuration information, and the second common configuration information comprises at least one of the following:

a subcarrier spacing supported by the cell; or a slice type supported by the cell.

5. The apparatus according to claim 1, wherein the processor is configured to execute instructions stored in the memory to cause the apparatus to:

send a first request to a terminal device, wherein the first request is for requesting the terminal device to collect the coverage information of the cell; and receive a first response from the terminal device, wherein the first response comprises the coverage information of the cell collected by the terminal device.

6. The apparatus according to claim 1, wherein the processor is further configured to determine a target cell based on the received energy saving policy.

7. The apparatus according to claim 1, wherein the energy saving policy includes at least one of the following: slot shutdown, power amplifier shutdown, carrier shutdown, cell shutdown, cell coverage adjustment, or load migration.

8. The apparatus according to claim 1, wherein the data sent to the AI device includes at least one of the following:

configuration information of a channel state information-reference signal in the cell;

a maximum quantity of terminal devices in a connected state supported in the cell;

a current quantity of terminal devices in a connected state in the cell;

quantity distribution of terminal devices in the cell;

spectral efficiency of the cell;

a throughput of the cell;

a load level of the cell; usage of an uplink physical resource block or a downlink physical resource block in the cell;

information about a slice supported by the cell; or usage of a beam resource in the cell.

9. The apparatus according to claim 1, wherein more than two cells are associated with the identifier of the ESA.

10. A communication apparatus, comprising a processor, coupled with a memory, wherein the processor is configured to execute instructions stored in the memory to cause the apparatus to:

receive data from a network device, wherein the data comprises coverage information of a cell and common configuration information of the cell;

obtain an energy saving policy at least based on the coverage information of the cell and the common configuration information of the cell; and sending the energy saving policy to the network device, wherein the energy saving policy comprises at least one of the following:

an identifier of an energy saving area (ESA) to which a cell served by the network device belongs, wherein an area of the ESA is larger than an area of the cell served by the network device; or an energy saving priority of each cell in the ESA, and wherein in a handover process, the cell served by the network device is preferentially handed over to a neighboring cell belonging to a same ESA identifier as the ESA identifier to which the cell served by the network device belongs.

11. The apparatus according to claim 10, wherein the coverage information of the cell comprises at least one of the following:

position information of a terminal device in the cell, beam information measured by the terminal device, cell quality information measured by the terminal device, time information, or cell identity information.

12. The apparatus according to claim 10, wherein the common configuration information of the cell comprises first common configuration information, and the first common configuration information comprises at least one of the following:

a period of a synchronization signal/physical broadcast channel block (SSB);

a period of a master information block (MIB);

a period of a system message block 1 (SIB1) or a period of a system message that needs to be broadcast and sent;

paging configuration information;

configuration information of a random access resource;

a quantity of SSB beams of the cell;

a quantity of antennas; or a maximum transmit power of the cell.

13. The apparatus according to claim 10, wherein the common configuration information of the cell comprises second common configuration information, and the second common configuration information comprises at least one of the following:

a subcarrier spacing supported by the cell; or a slice type supported by the cell.

14. A communication apparatus, comprising a processor coupled with a memory, wherein the processor is configured to execute instructions stored in the memory to cause the apparatus to:

receive coverage information of a cell served by a network device from a terminal device; and obtain an energy saving policy based on the coverage information of the cell and common configuration information of the cell, wherein the energy saving policy comprises at least one of the following:

an identifier of an energy saving area (ESA) to which the cell served by the network device belongs, wherein an area of the ESA is larger than an area of the cell served by the network device; or an energy saving priority of each cell in the ESA, and wherein in a handover process, the cell served by the network device is preferentially handed over to a neighboring cell belonging to a same ESA identifier as the ESA identifier to which the cell served by the network device belongs.

15. The apparatus according to claim 14, wherein the coverage information of the cell comprises at least one of the following:

position information of a terminal device in the cell, beam information measured by the terminal device, cell quality information measured by the terminal device, time information, or cell identity information.

16. The apparatus according to claim 15, wherein the processor is further configured to determine energy consumption information of the cell based on the coverage information, wherein the energy saving policy is determined based on the energy consumption information.

17. The apparatus according to claim 15, wherein the energy saving policy includes at least one of the following: slot shutdown, power amplifier shutdown, carrier shutdown, cell shutdown, cell coverage adjustment, or load migration.

18. The apparatus according to claim 14, wherein more than two cells are associated with the identifier of the ESA.

* * * * *